US012775556B2

(12) United States Patent
Wang et al.

(10) Patent No.: US 12,775,556 B2
(45) Date of Patent: Oct. 27, 2026

(54) METHOD FOR PRELOADING MEMORY PAGE, ELECTRONIC DEVICE, AND CHIP SYSTEM

(71) Applicant: Honor Device Co., Ltd., Shenzhen (CN)

(72) Inventors: Tao Wang, Shenzhen (CN); Fenghua Zuo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 237 days.

(21) Appl. No.: 18/704,728

(22) PCT Filed: Dec. 5, 2023

(86) PCT No.: PCT/CN2023/136403
§ 371 (c)(1),
(2) Date: Apr. 25, 2024

(87) PCT Pub. No.: WO2024/179104
PCT Pub. Date: Sep. 6, 2024

(65) Prior Publication Data

US 2026/0119404 A1 Apr. 30, 2026

(30) Foreign Application Priority Data

Feb. 28, 2023 (CN) ......................... 202310174653.0

(51) Int. Cl.
*G06F 12/08* (2016.01)
*G06F 12/0862* (2016.01)

(52) U.S. Cl.
CPC .... *G06F 12/0862* (2013.01); *G06F 2212/602* (2013.01)

(58) Field of Classification Search
CPC ....................... G06F 12/0862; G06F 2212/602
See application file for complete search history.

(56) References Cited

U.S. PATENT DOCUMENTS 9,727,256 B1 8/2017 Mayatskikh et al.
10,417,097 B2 9/2019 Levy et al.
(Continued)

FOREIGN PATENT DOCUMENTS

CN 107533549 A 1/2018
CN 108763104 A 11/2018
(Continued)

OTHER PUBLICATIONS

Sun Guofei et al;"Improvement of Live Memory Migration Mechanism for Virtual Machine Based on Pre-copy"; Computer Engineering;Jul. 5, 2011;pp. 4(with English abstract).
(Continued)

*Primary Examiner* — Hosain T Alam
*Assistant Examiner* — Subir Kumar Chowdhury
(74) *Attorney, Agent, or Firm* — Slater Matsil, LLP

(57) ABSTRACT

This application provides a method for preloading a memory page, an electronic device, and a chip system, and relate to the field of terminal application technologies. The method includes: After a hot start of an application ends, a page table entry snapshot is generated by using a page table entry that is accessed in a hot start procedure of the application. The page table entry snapshot may be stored in a disk or a memory. When the application is hot started next time, the page table entry snapshot of the application may be read in advance from the disk or the memory, and file page data and anonymous page data corresponding to the page table entry snapshot are loaded into a physical memory based on the page table entry snapshot; and a page table entry is filled.

20 Claims, 14 Drawing Sheets

(56) References Cited

U.S. PATENT DOCUMENTS

| | | | | |
|---|---|---|---|---|
| 12,299,061 | B1 * | 5/2025 | Sharma | G06F 16/24552 |
| 2016/0378680 | A1 * | 12/2016 | Sha | G06F 16/11 711/209 |
| 2021/0240636 | A1 | 8/2021 | Chen et al. | |
| 2021/0240637 | A1 | 8/2021 | Goss et al. | |
| 2023/0153246 | A1 | 5/2023 | Li et al. | |
| 2023/0266814 | A1 | 8/2023 | Shi et al. | |
| 2024/0054079 | A1 * | 2/2024 | Han | G06F 12/023 |

FOREIGN PATENT DOCUMENTS

| | | | |
|---|---|---|---|
| CN | 110427582 | A | 11/2019 |
| CN | 111982148 | A | 11/2020 |
| CN | 112445767 | A | 3/2021 |
| CN | 112783564 | A | 5/2021 |
| CN | 113296880 | A | 8/2021 |
| CN | 113590500 | A | 11/2021 |
| CN | 114116191 | A | 3/2022 |
| CN | 114185494 | A | 3/2022 |
| CN | 108763104 | B | 4/2022 |
| CN | 114416425 | A | 4/2022 |
| CN | 114443268 | A | 5/2022 |
| CN | 114461588 | A | 5/2022 |
| CN | 114546897 | A | 5/2022 |
| CN | 115509953 | A | 12/2022 |
| CN | 115509960 | A | 12/2022 |
| CN | 115543532 | A | 12/2022 |
| CN | 115629875 | A | 1/2023 |
| CN | 115858046 | A | 3/2023 |
| CN | 115858047 | A | 3/2023 |
| EP | 1870814 | A1 | 12/2007 |
| WO | 2016082191 | A1 | 6/2016 |
| WO | 2021218370 | A1 | 11/2021 |

OTHER PUBLICATIONS

Wang Zike;"Adaptive Container Pool-Based Cold Start Optimization for Serverless Computing";Huazhong University of Science and Technology;Oct. 15, 2022;pp. 78(with English abstract).

Miao Hanwei;"Android Boot Optimization Research and Application";South China University of Technology;Dissertation for the Master Degree;pp. 90(with English abstract).

Ivy Peng et al;"UMap: Enabling Application-driven Optimizations for Page Management";2019 IEEE/ACM Workshop on Memory Centric High Performance Computing (MCHPC);Jan. 2, 2020;pp. 8.

* cited by examiner

METHOD FOR PRELOADING MEMORY PAGE, ELECTRONIC DEVICE, AND CHIP SYSTEM

CROSS-REFERENCE TO RELATED APPLICATIONS

This application is a national stage of International Application No. PCT/CN2023/136403, filed on Dec. 5, 2023, which claims priority to Chinese Patent Application No. 202310174653.0, filed on Feb. 28, 2023. The disclosures of both of the aforementioned applications are hereby incorporated by reference in their entireties.

TECHNICAL FIELD

Embodiments of this application relate to the field of terminal application technologies, and in particular, to a method for preloading a memory page, an electronic device, and a chip system.

BACKGROUND

As functions of an electronic device are increasingly powerful, an increasingly large quantity of applications are installed in the electronic device, and a user may use, based on the applications installed in the electronic device, functions provided by the applications.

During a hot start of the application, due to a memory reclamation mechanism, when a swapped-out or released memory page is accessed again, a page fault usually occurs. After the page fault occurs, a system places a process of the application in a start procedure into a blocking queue until the problem of page fault is resolved. For example, after the page fault occurs, a physical memory is allocated to the application, related file page data and anonymous page data are loaded into the allocated physical memory, and a page table entry (Page Table Entry, PTE) used to store a mapping relationship between a virtual memory and a physical memory is filled with a mapping relationship between a virtual memory and a physical address of the allocated physical memory of the application. This causes a relatively long hot start time of the application and relatively poor user experience.

SUMMARY

Embodiments of this application provide a method for preloading a memory page, an electronic device, and a chip system, to increase a hot start speed of an application and improve user experience.

To achieve the foregoing objective, the following technical solutions are used in this application:

According to a first aspect, an embodiment of this application provides a method for preloading a memory page, including:

A kernel receives prefetch information, where the prefetch information includes an identifier of a first application and a hot start identifier;

the kernel reads a PTE snapshot corresponding to the identifier of the first application from first storage space in response to the prefetch information, where the PTE snapshot is generated based on a PTE that is accessed in a historical hot start procedure of the first application and in which a page object is a file page and an anonymous page, and the first storage space is located in a physical memory or a disk;

the kernel loads file page data and anonymous page data that respectively correspond to the PTE snapshot in a disk and a swap partition into a physical memory; and the kernel writes a mapping relationship between a virtual memory of the file page data and a physical memory of the file page data and a mapping relationship between a virtual memory of the anonymous page data and a physical memory of the anonymous page data into a PTE of the first application.

In this application, the PTE snapshot is generated by using the PTE that is accessed in the hot start procedure of the application and in which the page object is a file page and an anonymous page, and the PTE snapshot is stored in the first storage space. When the application is subsequently hot started, the PTE snapshot corresponding to the identifier of the same application is read from the first storage space. Then, the file page data and the anonymous page data that respectively correspond to the PTE snapshot in the disk and the swap partition are loaded into the physical memory, and the mapping relationship between the virtual memory and the physical memory of the file page data and the mapping relationship between the virtual memory and the physical memory of the anonymous page data are written into the PTE. The file page data and the anonymous page data are preloaded in advance, and the mapping relationship between the virtual memory and the physical memory of the file page data and the mapping relationship between the virtual memory and the physical memory of the anonymous page data are written into the PTE. Therefore, a page fault in the hot start procedure of the application is reduced, and a hot start speed of the application is increased.

In another implementation of the first aspect of this application, before the kernel receives the prefetch information, the method further includes:

The kernel receives capture information, where the capture information includes the identifier of the first application and the hot start identifier;

the kernel generates the PTE snapshot corresponding to the identifier of the first application in response to the capture information based on a PTE that is in a page table corresponding to the identifier of the first application and in which a page object is a file page and an anonymous page; and the kernel stores the PTE snapshot corresponding to the identifier of the first application in the first storage space.

In this application, the PTE snapshot of the application may be generated by using the PTE that is in the page table corresponding to the application in the historical hot start procedure and in which the page object is a file page and an anonymous page, so that during a subsequent hot start, the file page data and the anonymous page data are preloaded based on the PTE snapshot (both the file page and the anonymous page are memory pages).

In another implementation of the first aspect of this application, that the kernel generates the PTE snapshot corresponding to the identifier of the first application in response to the capture information based on a PTE that is in a page table corresponding to the identifier of the first application and in which a page object is a file page and an anonymous page includes:

The kernel determines, in response to the capture information, that the PTE snapshot corresponding to the identifier of the first application does not exist in the first storage space; and the kernel generates the PTE snapshot corresponding to the identifier of the first application based on the PTE that is in the page table corresponding to the identifier of the first application and in which the page object is a file page and an anonymous page.

In this application, there is no need to generate, after each hot start of the application, a PTE snapshot based on a PTE written in a current hot start procedure. When the PTE snapshot corresponding to the application does not exist in the first storage space, the PTE snapshot corresponding to the application needs to be generated based on the PTE that is in the page table corresponding to the application and in which the page object is a file page and an anonymous page. When the PTE snapshot corresponding to the application already exists in the first storage space, the PTE snapshot corresponding to the application does not need to be generated based on the PTE that is in the page table corresponding to the application and in which the page object is a file page and an anonymous page.

In another implementation of the first aspect of this application, that the kernel generates the PTE snapshot corresponding to the identifier of the first application based on a PTE that is in a page table corresponding to the identifier of the first application and in which a page object is a file page and an anonymous page includes:

The kernel generates the PTE snapshot corresponding to the identifier of the first application by using a PTE that is in the page table corresponding to the identifier of the first application and in which a status bit is a preset character and a page object is of a preset type, where the preset character is used to indicate that a virtual memory corresponding to the PTE is mapped to a physical memory (for example, may be determined by using pte_present) and accessed (for example, may be determined by viewing pte_young), and the preset type includes active, referenced, and anon.

In this application, a PTE for generating the PTE snapshot may be determined based on a status bit and a page object (that is, a page flag) in a data structure of the PTE. A type of the anonymous page is anon, and a file page whose type is active or referenced may be selected to generate the PTE snapshot. Some types of file pages are selected to generate the PTE snapshot, so that a balance between a time consumed for a prefetch procedure of loading a large quantity of file pages and a start speed of the application can be achieved.

In another implementation of the first aspect of this application, before the kernel receives the prefetch information, the method further includes:

A monitoring module detects that the first application is started to a prefetch node, where the prefetch node is before an ActivityStart phase in an application start procedure;

the monitoring module sends a prefetch instruction to a prefetch module; and the prefetch module transmits the prefetch information to the kernel in response to the prefetch instruction by using a system call.

In this application, a procedure of prefetching the file page and the anonymous page is implemented by using the kernel in kernel space; the prefetch time node is detected by using the monitoring module in user space; and information exchange between the user space and the kernel space is implemented by using the system call. To increase the start speed of the application, the prefetch time node may be determined before the ActivityStart phase in which a large quantity of page faults occur.

In another implementation of the first aspect of this application, before the kernel receives the capture information, the method further includes:

The monitoring module detects that the first application is started to a capture node, where the capture node is within a first time existing when or after a DoFrame phase in the application start procedure ends;

the monitoring module sends a capture instruction to the prefetch module; and the prefetch module transmits the capture information to the kernel in response to the capture instruction by using a system call.

In this application, a procedure of generating the PTE snapshot is implemented by using the kernel in the kernel space; a time node for generating the PTE snapshot is detected by using the monitoring module in the user space; and information exchange between the user space and the kernel space is implemented by using the system call. To generate some types of file pages and anonymous pages filled for a page fault in the hot start procedure of the application, the time node for capturing PTE information may be determined within the first time existing when or after the DoFrame phase in the application start procedure ends.

In another implementation of the first aspect of this application, before the kernel receives the capture information, the method further includes:

The monitoring module detects that the first application is started to a capture node, where the capture node is within a first time existing when or after the ActivityStart phase in the application start procedure ends;

the monitoring module sends a capture instruction to the prefetch module; and the prefetch module transmits the capture information to the kernel in response to the capture instruction by using a system call.

In this application, based on an actual situation, PTE information may alternatively be captured within the first time existing when or after the ActivityStart phase in which a large quantity of page faults occur in the application start procedure. In this case, the captured PTE information already includes most file page data and anonymous page data that are required in the hot start procedure of the application.

In another implementation of the first aspect of this application, the method further includes:

The kernel receives deletion information, where the deletion information includes the identifier of the first application; and the kernel deletes, in response to the deletion information, the PTE snapshot that corresponds to the identifier of the first application and that is stored in the first storage space.

In this application, to save storage space, the PTE snapshot of the application may be deleted when the application is deleted from an electronic device.

In another implementation of the first aspect of this application, before the kernel receives the deletion information, the method further includes:

The monitoring module receives an uninstall instruction of the first application; and the monitoring module transmits the deletion information to the kernel in response to the uninstall instruction by using a system call.

In another implementation of the first aspect of this application, the PTE includes a mapping relationship between a virtual memory and a physical memory, and the PTE snapshot includes a file name of file page data corresponding to the PTE, a storage address of the file page data in the disk, and a storage address of anonymous page data corresponding to the PTE in the swap partition.

According to a second aspect, an electronic device is provided, including a processor. The processor is configured to run a computer program stored in a storage, to implement the method according to any one of the implementations of the first aspect of this application.

According to a third aspect, a chip system is provided, including a processor. The processor is coupled to a storage, and the processor executes a computer program stored in the storage, to implement the method according to any one of the implementations of the first aspect of this application.

According to a fourth aspect, a computer-readable storage medium is provided. The computer-readable storage medium stores a computer program, and when the computer program is executed by one or more processors, the method according to any one of the implementations of the first aspect of this application is implemented.

According to a fifth aspect, an embodiment of this application provides a computer program product. When the computer program product runs on a device, the device is enabled to perform the method according to any one of the implementations of the first aspect of this application.

It may be understood that for beneficial effects of the second aspect to the fifth aspect, refer to the related descriptions in the first aspect. Details are not described herein.

DETAILED DESCRIPTION OF ILLUSTRATIVE EMBODIMENTS

In the following descriptions, for the purpose of description instead of limitation, specific details such as a specific system structure and a technology are provided, to thoroughly understand embodiments of this application. However, persons skilled in the art should understand that this application may also be implemented in another embodiment without these specific details.

It should be understood that when being used in this specification and the appended claims of this application, the term "include" indicates presence of a described feature, entirety, step, operation, element, and/or component, but does not rule out presence or addition of one or more other features, entireties, steps, operations, elements, components, and/or sets thereof.

It should be further understood that in embodiments of this application, "one or more" means one, two, or more than two, and "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between associated objects.

In addition, in the descriptions of this specification and the appended claims of this application, the terms such as "first", "second", "third", and "fourth" are used only to distinguish between descriptions, and should not be understood as an indication or implication of relative importance.

Referring to "one embodiment", "some embodiments", or the like that is described in this specification of this application means that specific features, structures, or characteristics described with reference to the embodiment are included in one or more embodiments of this application. Therefore, statements such as "in one embodiment", "in some embodiments", "in some other embodiments" that appear in different parts of this application do not necessarily refer to same embodiments, but mean "one or more but not all embodiments", unless otherwise specifically emphasized in other manners. The terms "include", "comprise", "have", and variants thereof all mean "include but are not limited to", unless otherwise specifically emphasized in other manners.

The method for preloading a memory page provided in embodiments of this application may be applied to an electronic device. The electronic device may be a tablet computer, a mobile phone, a wearable device, a notebook computer, an ultra-mobile personal computer (ultra-mobile personal computer, UMPC), a netbook, a personal digital assistant (personal digital assistant, PDA), or another electronic device. A specific type of the electronic device is not limited in embodiments of this application.

Figure 1:
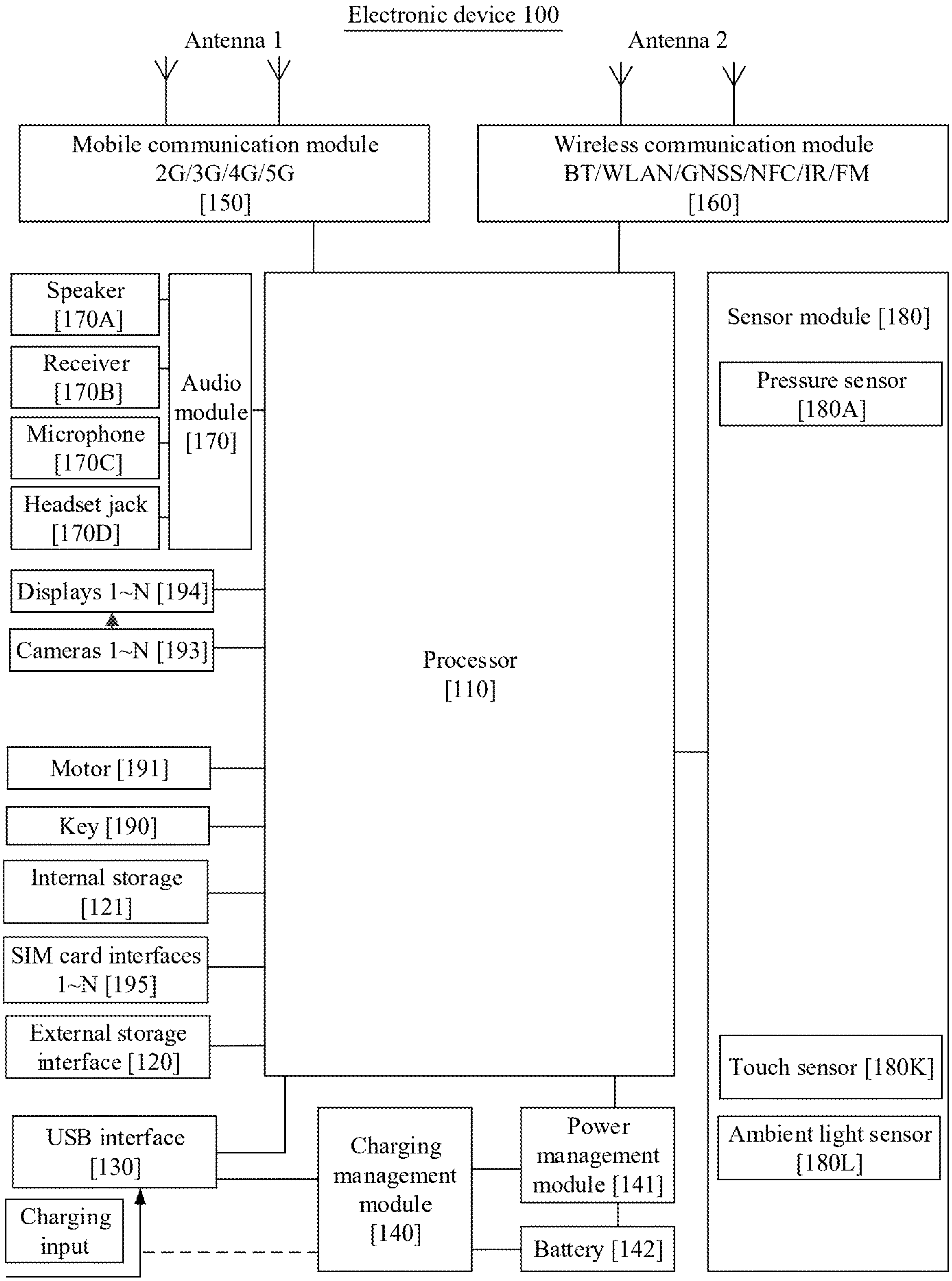
FIG. 1 is a schematic diagram of a hardware structure of an electronic device to which a method for preloading a memory page is applied according to an embodiment of this application.

FIG. 1 is a schematic diagram of a structure of an electronic device. The electronic device 100 may include a processor 110, an external storage interface 120, an internal storage 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, a camera 193, a display 194, a subscriber identification module (subscriber identification module, SIM) card interface 195, and the like. The sensor module 180 may include a pressure sensor 180A, a touch sensor 180K, an ambient light sensor 180L, and the like.

It may be understood that the structure shown in this embodiment of this application constitutes no specific limitation on the electronic device 100. In some other embodiments of this application, the electronic device 100 may include more or fewer components than those shown in the figure, some components may be combined, some components may be split, or components may be arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a storage, a video codec, a digital signal processor (digital signal processor, DSP), a coprocessor (sensor coprocessor, SCP), a baseband processor, and/or a neural-network processing unit (neural-network processing unit, NPU). Different processing units may be independent devices, or may be integrated into one or more processors. For example, the processor 110 is configured to perform the application start method in embodiments of this application.

The controller may be a nerve center and a command center of the electronic device 100. The controller may generate an operation control signal based on instruction operation code and a timing signal, to complete control of instruction fetching and instruction execution.

A storage may be further disposed in the processor 110, and is configured to store instructions and data. In some embodiments, the storage in the processor 110 is a cache. The storage may store instructions or data recently used or cyclically used by the processor 110. If the processor 110 needs to use the instructions or the data again, the processor 110 may directly invoke the instructions or the data from the storage. This avoids repeated access and reduces a waiting time of the processor 110, thereby improving system efficiency.

The USB interface 130 is an interface that complies with USB standard specifications, and may be specifically a Mini USB interface, a Micro USB interface, a USB Type C interface, or the like. The USB interface 130 may be configured to be connected to a charger to charge the electronic device 100, or may be configured to transmit data between the electronic device 100 and a peripheral device.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The external storage interface 120 may be configured to be connected to an external storage card, for example, a Micro SD card, to expand a storage capability of the electronic device 100. The external storage card communicates with the processor 110 through the external storage interface 120, to implement a data storage function, for example, to store files such as music and a video in the external storage card.

The internal storage 121 may be configured to store computer-executable program code, and the executable program code includes instructions. The processor 110 runs the instructions stored in the internal storage 121, to perform various function applications and data processing of the electronic device 100. The internal storage 121 may include a program storage area and a data storage area. The program storage area may store an operating system and an application required by at least one function (for example, a sound playing function and an image playing function).

In addition, the internal storage 121 may include a high-speed random access memory, and may further include a nonvolatile storage, for example, at least one magnetic disk storage device, a flash storage device, or a universal flash storage (universal flash storage, UFS).

The charging management module 140 is configured to receive a charging input from a charger. The charger may be a wireless charger or a wired charger. In some embodiments of wired charging, the charging management module 140 may receive a charging input from a wired charger through the USB interface 130.

The power management module 141 is configured to be connected to the battery 142, the charging management module 140, and the processor 110. The power management module 141 receives an input from the battery 142 and/or the charging management module 140, and supplies power to the processor 110, the internal storage 121, an external storage, the display 194, the camera 193, the wireless communication module 160, and the like.

In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G and the like and that is applied to the electronic device 100. The mobile communication module 150 may include at least one filter, switch, power amplifier, low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal obtained after modulation by the modem processor, and convert the signal into an electromagnetic wave for radiation through the antenna 1.

The wireless communication module 160 may provide a wireless communication solution that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), infrared (infrared, IR), and the like and that is applied to the electronic device 100. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology.

The electronic device 100 may implement an audio function by using the audio module 170, the speaker 170A, the receiver 170B, the microphone 170C, the headset jack 170D, the application processor, and the like, for example, implement music playing and audio recording.

The audio module 170 is configured to convert a digital audio signal into an analog audio signal for output, and is further configured to convert an analog audio input into a digital audio signal. The audio module 170 may be further configured to encode and decode an audio signal. In some embodiments, the audio module 170 may be disposed in the processor 110 or some functional modules of the audio module 170 may be disposed in the processor 110.

The speaker 170A, also referred to as a "loudspeaker", is configured to convert an audio electrical signal into a sound signal. The electronic device 100 may be used to listen to music or answer a call in a hands-free mode by using the speaker 170A.

The receiver 170B, also referred to as an "earpiece", is configured to convert an audio electrical signal into a sound signal. When a call is answered or a voice message is listened to by using the electronic device 100, the receiver 170B may be put close to a human ear to listen to a voice.

The microphone 170C, also referred to as a "mic" or "mike", is configured to convert a sound signal into an electrical signal. When making a call or sending a voice message, a user may make a sound by approaching the mouth to the microphone 170C, to input a sound signal to the microphone 170C. At least one microphone 170C may be disposed in the electronic device 100. In some other embodiments, two microphones 170C may be disposed in the electronic device 100, to implement a noise reduction function in addition to listening to a voice message. In some other embodiments, three, four, or more microphones 170C may alternatively be disposed in the electronic device 100, to collect a sound signal, reduce noise, further identify a sound source, implement a directional recording function, and the like. For example, the microphone 170C may be configured to collect the voice message in this embodiment of this application.

The headset jack 170D is configured to be connected to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When force is applied onto the pressure sensor 180A, a capacitance between electrodes changes. The electronic device 100 determines intensity of pressure based on a change of the capacitance. When a touch operation is performed on the display 194, the electronic device 100 detects strength of the touch operation by using the pressure sensor 180A. The electronic device 100 may also calculate a touch position based on a detected signal of the pressure sensor 180A.

The touch sensor 180K is also referred to as a "touch panel". The touch sensor 180K may be disposed on the display 194. The touch sensor 180K and the display 194 form a touchscreen, also referred to as a "touch control screen". The touch sensor 180K is configured to detect a touch operation performed on or near the touch sensor 180K. The touch sensor may transmit a detected touch operation to the application processor to determine a type of a touch event. A visual output related to the touch operation may be provided by using the display 194. In some other embodiments, the touch sensor 180K may alternatively be disposed on a surface of the electronic device 100, at a position different from that of the display 194.

The ambient light sensor 180L is configured to sense ambient light brightness. The electronic device 100 may adaptively adjust brightness of the display 194 based on the sensed ambient light brightness. The ambient light sensor 180L may be further configured to automatically adjust white balance during photographing. The ambient light sensor 180L may further cooperate with an optical proximity sensor 180G to detect whether the electronic device 100 is in a pocket to prevent an accidental touch.

The key 190 includes a power on/off key, a volume key, and the like. The key 190 may be a mechanical key, or may be a touch key. The electronic device 100 may receive a key input and generate a key signal input related to user settings and function control of the electronic device 100.

The motor 191 may generate a vibration prompt. The motor 191 may be configured to provide a vibration prompt for an incoming call, and may be further configured to provide vibration feedback for a touch.

The electronic device 100 implements a display function by using the GPU, the display 194, the application processor, and the like. The GPU is a microprocessor for image processing and is connected to the display 194 and the application processor. The GPU is configured to perform mathematical and geometric computing for graphics rendering. The processor 110 may include one or more GPUs, and the one or more GPUs execute program instructions to generate or change displayed information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include one or N displays 194, where N is a positive integer greater than 1.

The camera 193 is configured to capture a still image or a video. An optical image is generated for an object through a lens and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The SIM card interface 195 is configured to be connected to a SIM card. The SIM card may be inserted into the SIM card interface 195 or removed from the SIM card interface 195 to implement contact with and separation from the electronic device 100. The electronic device 100 may support one or N SIM card interfaces, where N is a positive integer greater than 1. The SIM card interface 195 may support a Nano SIM card, a Micro SIM card, a SIM card, and the like. A plurality of cards may be simultaneously inserted into a same SIM card interface 195. The plurality of cards may be of a same type or different types. The SIM card interface 195 may also be compatible with SIM cards of different types. The SIM card interface 195 may be further compatible with the external storage card. The electronic device 100 interacts with a network by using the SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

In the embodiments of this application, a specific structure of an execution body of the method for preloading a memory page is not specifically limited, provided that code in which the method for preloading a memory page in the embodiments of this application is recorded can be run to perform communication based on the method for preloading a memory page provided in the embodiments of this application. For example, the execution body of the method for preloading a memory page provided in the embodiments of this application may be a functional module that is in an electronic device and that can invoke a program and execute the program or a communication apparatus applied to an electronic device, for example, a chip.

In page memory management, an operating system may allocate a virtual memory to a process. For example, in a 32-bit operating system, largest space of a virtual memory allocated to each process is 4 GB. The virtual memory may be divided into pages of a fixed size, and each page is one Page. For example, the virtual memory may be divided into pages of a size of 4 KB (or may be 8 KB, 16 KB, or the like). In addition, a kernel may divide a physical memory of the electronic device into pages of a same size. The page in the physical memory may be recorded as a physical page. In this way, a smallest allocation unit in both the virtual memory and the physical memory is a page.

Data (for example, a code segment, a data segment, and a stack segment) corresponding to a user program is stored in the physical memory, and the user program cannot directly access or view the physical memory. However, the user program may directly access or view the virtual memory. Therefore, a mapping relationship between the virtual memory and the physical memory, that is, a mapping relationship between the virtual memory and the physical memory, needs to be established.

As described above, the smallest allocation unit in the virtual memory and the physical memory is a page, each page in the virtual memory has a virtual address, and each page in the physical memory has a physical address. Therefore, the mapping relationship between the virtual memory and the physical memory may be represented by recording a mapping relationship between a virtual address of the virtual memory and a physical address of the physical memory.

Figure 2:
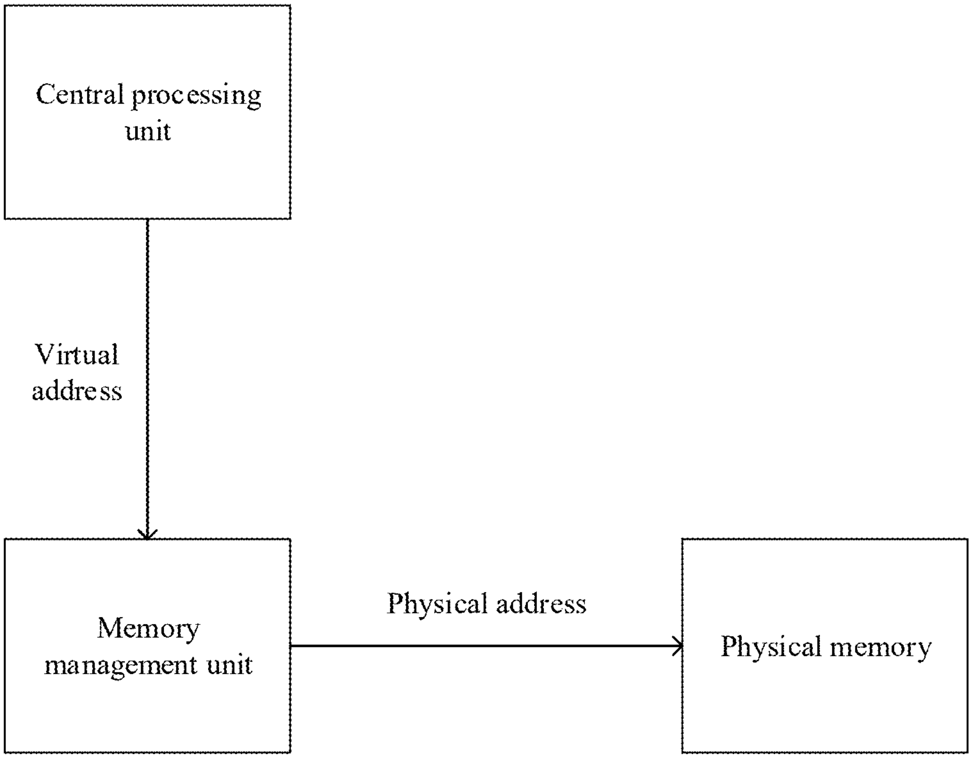
FIG. 2 is a schematic diagram of a data flow direction from a virtual address to a physical address according to an embodiment of this application.

FIG. 2 is a diagram of a flow direction from a virtual address to a physical address according to an embodiment of this application. When a central processing unit (central processing unit, CPU) needs to access data or obtain an instruction, the central processing unit sends a virtual address corresponding to the data or the instruction to a memory management unit (memory management unit, MMU). The memory management unit is responsible for searching for a physical address corresponding to the virtual address based on the foregoing mapping relationship. The memory management unit sends the found physical address to the physical memory, and the physical memory performs corresponding access based on the physical address, and then reads or writes related data or a related instruction.

The memory management unit stores a page table for each user program. The page table stores a mapping relationship between a virtual page (the virtual page corresponds to a virtual address) and a physical page (the physical page corresponds to a physical address). After a physical page is allocated to a virtual page, a record is added to the page table to store a mapping relationship between the virtual page and the physical page. Subsequently, a received virtual address may be converted into a physical address based on the mapping relationship that is between the virtual page and the physical page and that is stored in the page table.

Certainly, after receiving a virtual address, the memory management unit first needs to determine whether the virtual address is valid, whether the virtual address is in the physical memory, and whether the virtual address is protected.

If the virtual address is valid, a corresponding physical address exists in the physical memory, and the virtual address is not protected (that is, is accessible), the virtual address may be used as an index, and the physical address corresponding to the virtual address is found in the page table.

However, there may also be the following case that triggers a page fault: The virtual address is valid, but the physical address corresponding to the virtual address does not exist in the physical memory.

This case may be caused due to a lazy allocation mechanism. That is, when a user program is started, a virtual memory is allocated to the user program. However, in this case, no physical memory is allocated, and naturally there is no mapping relationship between the virtual memory and the physical memory. When data needs to be accessed during running of the user program, the physical memory is searched for a physical address corresponding to a virtual address corresponding to the data based on the virtual address. However, because no physical memory is allocated, the physical address corresponding to the virtual address is not found in the physical memory, and a page fault is triggered. This type of page fault occurs relatively frequently in a cold start procedure of an application.

This case may alternatively be caused by swapping out accessed data from the physical memory. For example, after a user program is switched to the background for running, because there are limited physical memory resources, the operating system starts memory page swapping, and places a physical page (for example, an anonymous page) that is not used for a long time into a swap partition, to allocate a freed physical memory resource to another user program for use. If data accessed by the user program is located in the swap partition, the physical address corresponding to the virtual address is not found in the physical memory, and a page fault is triggered. The operating system may alternatively reclaim a physical page (for example, a file page) that is not used for a long time, to allocate a freed physical memory resource to another user program for use. If data accessed by the user program is reclaimed from the physical memory to a disk, the physical address corresponding to the virtual address is not found in the physical memory, and a page fault is triggered. This type of page fault occurs relatively frequently in a hot start procedure of an application.

In both the two types of page faults, there may be a need to read data from the disk or the swap partition (for example, read file page data from the disk and anonymous page data from the swap partition) to the physical memory, establish a mapping relationship between a virtual address of read memory page data (including the file page data and the anonymous page data) and a physical address in which the read data is currently located, and fill a PTE, so that the user program can continue to run. In this case, running of the user program is severely blocked.

Certainly, in actual application, there may be further other abnormal cases. This embodiment of this application does not focus on a cause of the page fault. Therefore, the cases are not listed one by one.

After the page fault occurs, the operating system places the user program into a blocking queue, and places the user program into a ready queue after the problem of page fault is resolved, so that the user program can continue to run. Therefore, after the page fault occurs, running of the user program is blocked.

In a procedure of starting an application, a relatively large quantity of page faults described above may occur, resulting in a relatively slow procedure of starting the application and relatively poor user experience.

Manners of starting the application may include a cold start and a hot start. When the application is started, if no process of the application exists in the system, the system needs to create a process for the application, to indicate that a current start of the application is a cold start.

In an example of a cold start of the application, after the electronic device is powered on, a user taps an icon of the application on a system desktop to start the application, and a current start procedure of the application is a cold start.

In another example of a cold start of the application, after a user starts the application, the user switches the application to the background for running. Because the system reclaims resources, the process of the application is killed. When the user starts the application again, a current start procedure of the application is a cold start.

Figure 3:
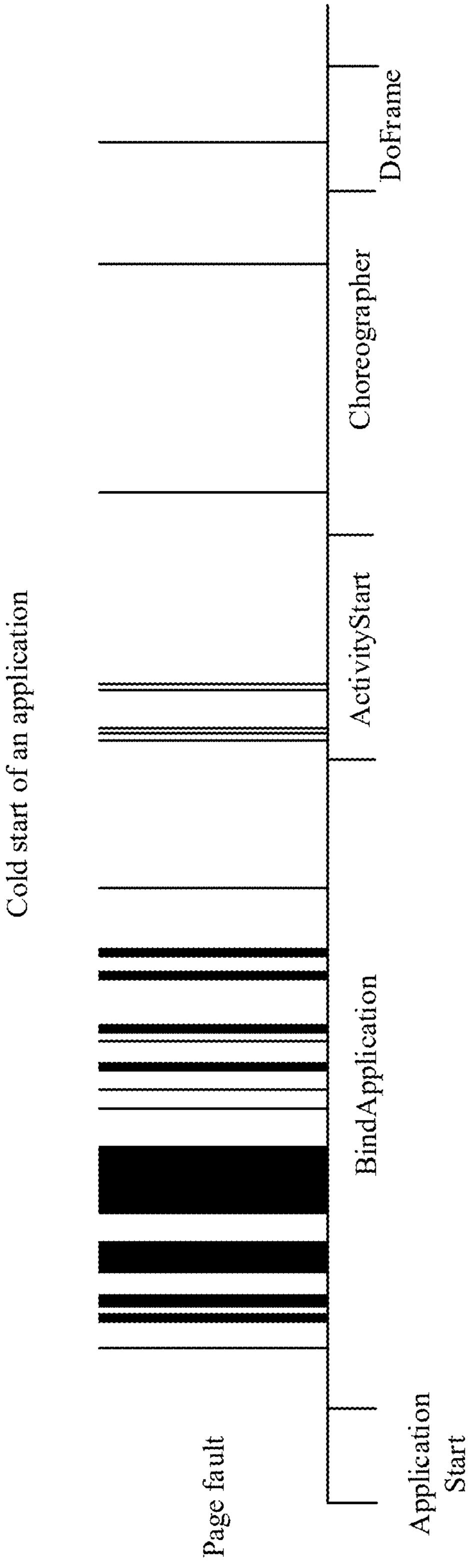
FIG. 3 is a schematic diagram of a page fault during a cold start of an application according to an embodiment of this application.

FIG. 3 is a schematic diagram of a page fault in a cold start procedure of an application according to an embodiment of this application. As shown in the figure, a horizontal axis represents phases in the cold start procedure of the application, and several phases, namely, ApplicationStart, BindApplication, ActivityStart, Choreographer, and DoFrame, are mainly listed. For details of these phases, refer to descriptions in subsequent embodiments. A black vertical line indicates that a page fault occurs. A thicker black vertical line indicates that a larger quantity of page faults occur in a short time. It may be understood from FIG. 3 that in the cold start procedure of the application, a relatively large quantity of page faults occur in the BindApplication phase, and a small quantity of page faults occur in the ActivityStart phase. These page faults cause a relatively slow cold start procedure of the application.

When the application is started, if a process of the application already exists in the system, the system does not need to create a process for the application, but starts to create an Activity and perform a subsequent operation by using the process that already exists in the system, to indicate that a current start of the application is a hot start.

In an example of a hot start of the application, after a user starts the application, the user switches the application to the background for running, and the user may switch the application to the foreground for running in a plurality of manners. For example, when the application runs in the background, an icon of the application on a system desktop is tapped; when the application runs in the background, the application is accessed from a leftmost home screen; or when the application runs in the background, the application is started by using an applet. Before the application is switched to the foreground for running, the process of the application always exists in the system and is not killed by the system. When the process of the application is not killed, a start procedure of switching the application from the background to the foreground for running is a hot start.

Figure 4:
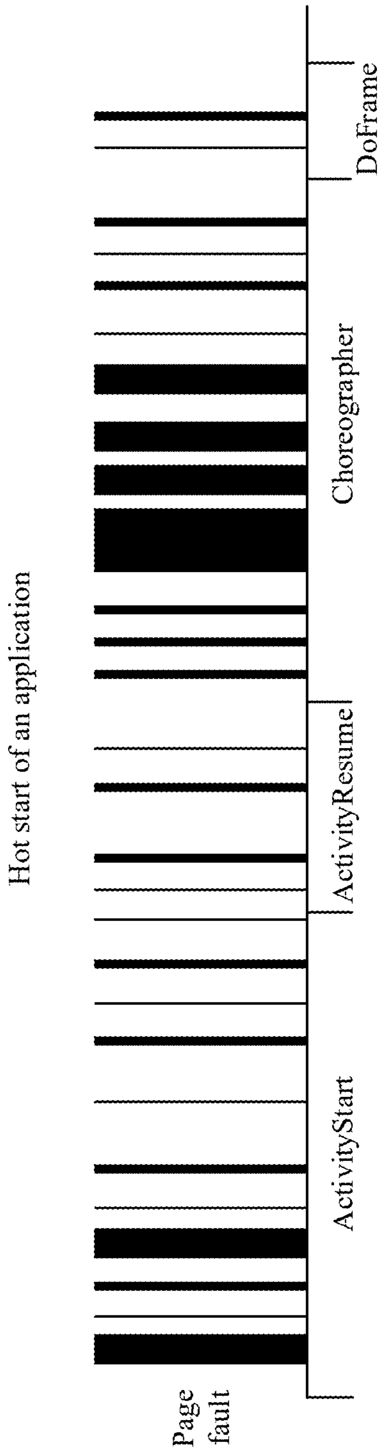
FIG. 4 is a schematic diagram of a page fault during a hot start of an application according to an embodiment of this application.

FIG. 4 is a schematic diagram of a page fault in a hot start procedure of an application according to an embodiment of this application. As shown in the figure, a horizontal axis represents the hot start procedure of the application, and several phases, namely, ActivityStart, ActivityResume, Choreographer, and DoFrame, are mainly listed. For details of these phases, refer to descriptions in subsequent embodiments. A black vertical line indicates that a page fault occurs. A thicker black vertical line indicates that a larger quantity of page faults occur in a short time. It may be understood from FIG. 4 that in the hot start procedure of the application, a relatively large quantity of page faults occur in all of the ActivityStart phase, the ActivityResume phase, the Choreographer phase, and the DoFrame phase. These page faults cause a relatively slow hot start procedure of the application.

It may be understood from FIG. 3 and FIG. 4 that in a procedure of starting the application, a page fault occurs frequently, resulting in a relatively low speed of starting the application and relatively poor user experience.

Quantities of page faults in FIG. 3 and FIG. 4 are merely used for comparison between phases, and do not indicate an absolute quantity of page faults in each phase.

To resolve the foregoing problem, the embodiments of this application provide a method for preloading a memory page. After a start of an application ends, missing page information in a start procedure of the application may be recorded by using a page table entry (Page Table Entry, PTE) snapshot, to generate the PTE snapshot, and the PTE snapshot is stored in a disk (or may be stored in a physical memory during a hot start). When the application is subsequently started, memory page data corresponding to the recorded missing page information may be preloaded into a physical memory based on the PTE snapshot stored in the disk (or the physical memory).

For a cold start, the generated PTE snapshot includes a file name of file page data corresponding to a PTE written during the current start, a storage address of the file page data in a disk, and the like. Therefore, the file page data corresponding to the PTE snapshot is preloaded. The foregoing preloading procedure may be performed before completion of process creation. After the file page data is preloaded into the physical memory, in a subsequent start procedure, there is no need to load the file page data from the disk into the physical memory. Therefore, a time for loading the file page data from the disk into the physical memory can be saved, and a cold start speed of the application can be increased.

In addition, in a cold start procedure, after a start of a process is completed, a system allocates a virtual memory to the process, establishes a mapping relationship between a virtual address and a physical address of the loaded file page data in the physical memory based on the physical address, and fills the PTE (for example, fills the PTE with the mapping relationship between the virtual address and the physical address). After the PTE is filled, occurrence of a page fault may be reduced, and the cold start speed of the application is increased.

For a hot start, the generated PTE snapshot includes a file name of file page data corresponding to a PTE accessed during the current start, a storage address of the file page data in a disk, a storage address, in a swap partition, of anonymous page data corresponding to the PTE accessed during the current start, and the like. Therefore, data loaded into the physical memory includes the file page data (for example, data reclaimed to the disk), and further includes the anonymous page data (for example, data swapped to the swap partition). A process of the application exists in a system, and virtual space of the process is already allocated. Therefore, in a hot start procedure, after the memory page data is loaded into the physical memory based on the PTE snapshot, a mapping relationship between a virtual address and a physical address of the loaded memory page data in the physical memory may be directly established based on the physical address, and the PTE may be filled (for example, filled with the mapping relationship between the virtual address and the physical address). Therefore, occurrence of a page fault is reduced, and a hot start speed of the application is increased.

For ease of subsequent description, the memory page data is uniformly used for the cold start and the hot start to represent the data preloaded into the physical memory based on the PTE snapshot.

To more clearly understand the method for preloading a memory page provided in the embodiments of this application, a source of a PTE snapshot is first described.

When an application is cold started, a system creates a process for the application, and allocates a virtual memory (for example, of a size of 4 GB) to the process. When the application is hot started, the process of the application in the system is not killed, and the virtual memory of the process also exists.

Virtual space corresponding to one process is described by two data structures: mm_struct and vm_area_struct.

Figure 5:
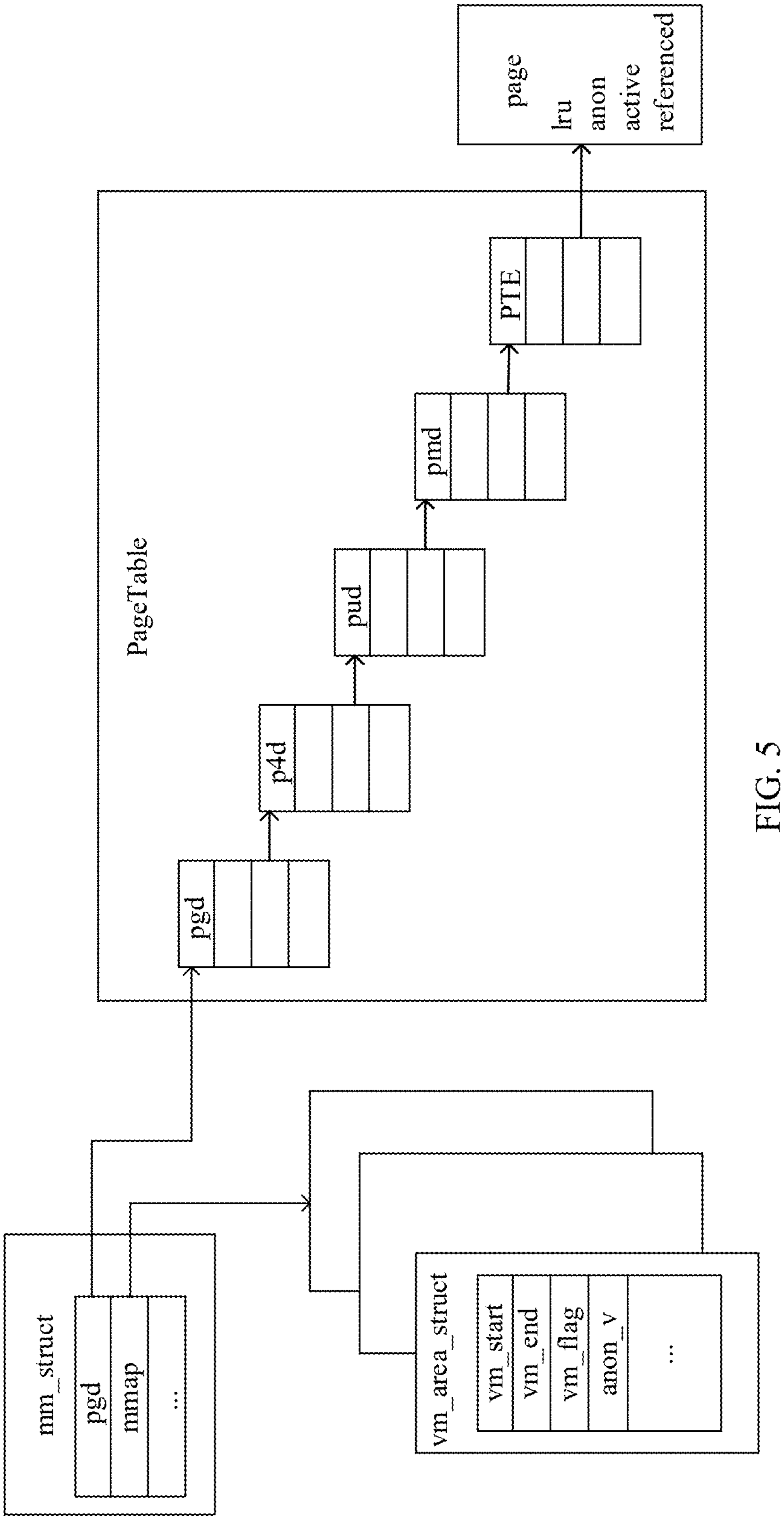
FIG. 5 is a diagram of a data structure relationship that describes virtual space of a process according to an embodiment of this application.

With reference to FIG. 5, each process has only one mm_struct structure. The mm_struct structure describes all virtual space of the process. The mm_struct structure includes a page directory pointer (Page Global Directory, pgd) of the process and a plurality of pointers mmap that point to the vm_area_struct structure.

The system allocates virtual space to the process based on a segment, that is, may allocate a plurality of virtual memory areas (virtual Memory Area, VMA) to the process. Each virtual memory area corresponds to one vm_area_struct structure. When n virtual memory areas are allocated to the process, there are n vm_area_struct structures, and in the mm_struct structure, there are n pointers mmap that respectively point to different vm_area_struct structures.

A vm_area_struct structure corresponding to a virtual memory area is used as an example. In this case, vm_start and vm_end respectively represent a start address and an end address of an area to which the virtual memory area points.

The parameter vm_flags describes an attribute of the virtual memory area, and flags may be VM_READ (that is, readable), VM_WRITE (that is, writable), VM_EXEC (that is, executable), or VM_SHARED (that is, shared by a plurality of processes).

Other parameters in the vm_area_struct structure are not provided one by one by using examples.

Each virtual memory area includes a plurality of virtual pages, and the virtual page in each virtual memory area points to a physical page through a page table entry (PTE) in a page table (Page Table, PT).

The page directory pointer pgd points to a page table of the process. The page table records a mapping relationship between a virtual page and a physical page. The page table includes a plurality of page table entries (Page Table Entry, PTE). Each page table entry points to one page frame. The page frame is a real physical page in a physical memory. The physical page may store data.

A virtual memory of a size of 4 GB is used as an example, and is divided into virtual pages of a size of 4 KB. In this case, there are 1024*1024 virtual pages in the virtual memory. Correspondingly, the page table of the process includes 1024*1024 page table entries PTEs.

When the process needs to access a virtual address, a vm_area_struct structure in which the virtual address is located may be found in the mm_struct structure. If information recorded in the vm_area_struct structure is that no physical address is allocated to the virtual address, a page fault is triggered, a physical address is allocated to the virtual address, related information about the virtual address in the vm_area_struct structure is modified (for example, information indicating that no physical memory is allocated is modified to information indicating that a physical memory is allocated), and a PTE corresponding to the virtual address is filled with a mapping relationship between the virtual address and the physical address. Therefore, related information about all page faults in a start procedure of the application may be recorded in the vm_area_struct structure and the PTE.

In this embodiment of this application, a PTE needs to be traversed to find a PTE filled (or accessed) in a current start procedure, so as to generate a PTE snapshot. However, the page table of the process includes 1024*1024 page table entries PTEs, and a traversal procedure is very time-consuming.

As described above, when the virtual address is accessed, the corresponding PTE may be found in the vm_area_struct structure. Similarly, when the PTE is traversed, it may be quickly determined, from the vm_area_struct structure, whether to traverse a PTE corresponding to each virtual address. In an example, the virtual space corresponding to the process of the application includes n (for example, 3 or 4) virtual memory areas, and each virtual memory area corresponds to one vm_area_struct structure. If a first virtual memory area is not mapped to a physical memory, a vm_area_struct structure corresponding to the virtual memory area does not need to be traversed, and a direct jump to a vm_area_struct structure corresponding to a second virtual memory area is made, to increase a speed of traversing the PTE. After the jump to the vm_area_struct structure corresponding to the second virtual memory area is made, based on related information about each virtual address (for example, whether the virtual address is valid, has a physical address, and is accessible) in the vm_area_struct structure corresponding to the second virtual memory area, the page table is searched for a PTE corresponding to a virtual address that is valid, has a physical address, and is accessible. In this manner, the PTE may be quickly traversed.

The PTE may be quickly traversed in the foregoing traversal manner. A memory page filled (or accessed for a hot start) in the current start procedure is found, and then a PTE snapshot is generated based on the found PTE. When the application is subsequently started, memory page data may be preloaded into a physical memory based on the stored PTE snapshot, to save a procedure of loading the memory page data into the physical memory in the start procedure of the application. After the memory page data is loaded into the physical memory, the PTE may be further filled when the start of the process is completed and virtual space is allocated or when the process exists with allocated virtual space. This can reduce occurrence of a page fault, and increase a start speed of the application.

In this embodiment of this application, a page table with five-level mapping is used as an example to describe a PTE in the page table.

With reference to FIG. 5, the page table includes a page directory pointer (Page Global Directory, pgd), a page four directory pointer (page four directory, p4d), a page upper directory pointer (Page Upper Directory, pud), a page middle directory pointer (Page Middle Directory, pmd), and a page table entry (Page Table Entry, PTE).

Each process corresponds to a different pgd. When a new process is created, a new page directory pointer pgd needs to be created for the new process. The pgd includes several p4d addresses, the p4d includes several pud addresses, the pud includes several pmd addresses, and the pmd includes several page table entry PTE addresses. Each page table entry PTE points to one page frame. The page frame is a real physical page in a physical memory.

Figure 6:
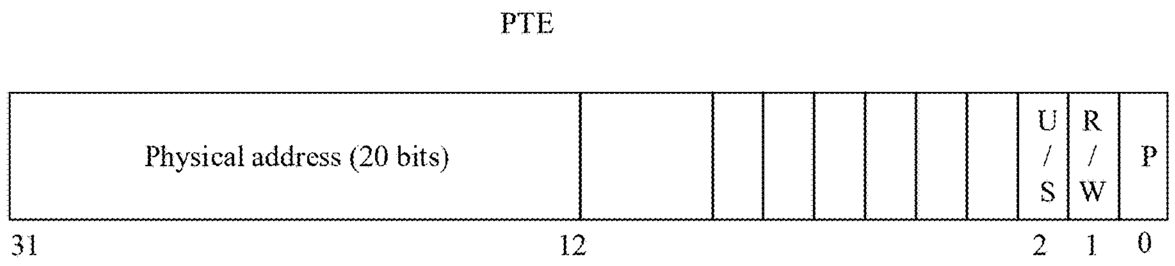
FIG. 6 is a schematic diagram of a data structure of a PTE according to an embodiment of this application.

FIG. 6 is an example of a structure of a page table entry PTE.

Bits 12 to 31 in the PTE are address bits in which a 4K-aligned start physical address corresponding to the virtual page is stored. All PTE addresses are usually page-aligned. Because only the 20 most significant bits are valid address bits, only the 20 most significant bits are required to indicate a physical address in the page table entry that points to the physical address. Therefore, the remaining 12 bits may be used for another purpose, and may be used as status bits.

In an example, a bit P (which may also be recorded as present) indicates whether a virtual page corresponding to the page table entry is mapped to a physical memory. If the bit is 0, it indicates that no mapping is established for the virtual page, data corresponding to the virtual page is swapped out from a physical memory, or the virtual page is no longer used. When the bit is 0, it indicates that a virtual page corresponding to the page table entry is mapped to a physical memory.

An R/W bit indicates a read/write attribute of a physical page to which the virtual page corresponding to the page table entry points. For example, 0 indicates only readable, and 1 indicates readable and writable. The R/W bit in the PTE is set by software. A setting basis is a virtual memory area to which the virtual page belongs, that is, a VM_READ/VM_WRITE attribute set in the virtual memory area is copied to the PTE of the virtual page included in the virtual memory area.

U/S represents access permission of the physical page to which the virtual page corresponding to the page table entry points. For example, 0 indicates that the physical page can be accessed only by a kernel.

Specific meanings of other bits are not explained one by one.

In addition, each PTE corresponds to one pageflag (that is, a page object). Information indicating that a physical page represented by the PTE is a file page or an anonymous page (anon), and a specific type, for example, active or referenced, of the file page are recorded in the pageflag.

For an application, only some PTE pages may be used in a start procedure of the application. For example, 1024*1024 PTE pages may exist in a virtual memory of 4 GB, and only some PTE pages may be used in the start procedure of the application. Therefore, a valid PTE page (PTE page used in the current start procedure) further needs to be selected. In actual application, the valid PTE page may be identified from the PTE by using the status bit (for example, the P bit indicates that mapping to a physical memory is implemented). Then, snapshot information is generated based on the valid PTE page, to obtain a PTE snapshot during the current start of the application. The PTE snapshot may be stored in a disk (may be stored in a physical memory during a hot start). When the application is started next time, memory page data corresponding to information in the PTE snapshot is loaded into a physical memory in advance from a disk (or a physical memory), to save a procedure of loading the memory page data from the disk or a swap partition into the physical memory in a start procedure. In addition, when the PTE may be filled, the PTE may be pre-filled. Therefore, occurrence of a page fault is reduced, and a start speed of the application is increased.

It should be noted that during a cold start of the application, when versions of the application are consistent, a read file page is fixed. Therefore, after the cold start of the application ends, a valid PTE (for example, it is determined, based on a P bit, that mapping to a physical memory is implemented) corresponding to a file page (for example, it may be determined, based on a page object, whether the file page is a file page) in missing page information in a current cold start procedure of the application may be used to generate a PTE snapshot corresponding to the cold start, and the PTE snapshot may be stored in a form of a file in a disk. Therefore, for the cold start, a PTE snapshot may be generated based on a PTE in which a page object is a file page, and a file page is prefetched during a subsequent cold start. Therefore, for the cold start, the method for preloading a memory page provided in the embodiments of this application may also be understood as a method for preloading a file page.

During a hot start of the application, due to a memory reclamation mechanism, a PTE corresponding to an anonymous page in the missing page information may further need to be used to generate a PTE snapshot. In addition, a hot start procedure of the application takes a relatively short time. If all file pages are preloaded, a hot start speed of the application may be further affected. Therefore, PTEs corresponding to some types of file pages may be selected based on an actual situation to generate the PTE snapshot. For example, active and referenced types may be selected.

It should be noted that in actual application, different status bits may be selected based on an actual situation to determine a physical page for generating the PTE snapshot, or PTEs corresponding to different types of file pages may be selected to generate the PTE snapshot.

Based on the foregoing descriptions, it may be understood that after the start ends, some types of file pages (for example, active and referenced) and anonymous pages in the missing page information in a current hot start procedure of the application may be used to generate a PTE snapshot corresponding to the hot start, and the PTE snapshot may be stored in a form of a file in a disk, or may be cached in a memory.

When the application is subsequently cold started, the PTE snapshot corresponding to the cold start is read from the disk. When the application is subsequently hot started, the PTE snapshot corresponding to the hot start is read from the disk or the cache.

The following describes, based on the foregoing principle, a specific implementation of the method for preloading a memory page provided in the embodiments of this application.

A start manner in which a user taps an icon of an application on a system desktop for the first time after an electronic device is powered on is used as an example. The start manner is a cold start. A cold start procedure mainly includes:

A system starts to load and start the application, and creates a process for the application. This procedure may be recorded as ApplicationStart.

The system binds the created process to the application. This procedure may be recorded as BindApplication.

The process of the application creates and starts a first Activity. This procedure is recorded as ActivityStart.

A Choreographer object is created to monitor Vsync, so that a drawing task can be executed based on a screen refresh rate. This procedure is recorded as Choreographer.

The drawing task, for example, a measurement, layout, and drawing procedure of a window corresponding to the first Activity, is processed based on the screen refresh rate. A drawing phase in this procedure may be recorded as DoFrame.

It may be understood from FIG. 3 that during the cold start of the application, a page fault mainly occurs in a BindApplication phase, a small quantity of page faults occur in an ActivityStart phase, and after the ActivityStart phase ends, few page faults occur.

Figure 7:
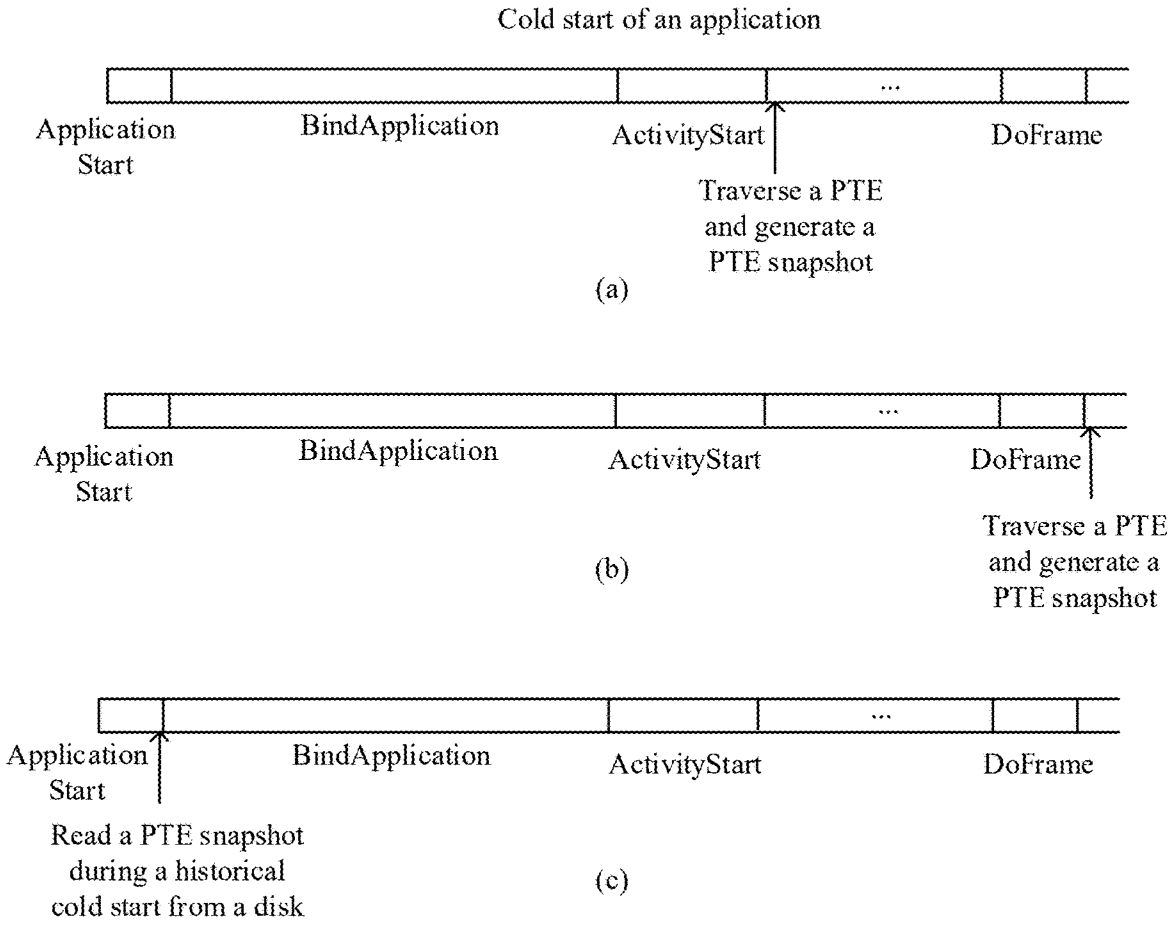
FIG. 7 is a schematic diagram of a time node for capturing a PTE snapshot and a time node for preloading the PTE snapshot during a cold start of an application according to an embodiment of this application.

With reference to (a) in FIG. 7, after the ActivityStart phase ends, a status bit in a PTE in a page table and a pageflag to which the PTE points may be traversed, to obtain a file page used during the current cold start of the application, and a PTE snapshot may be generated based on the used file page.

In another embodiment of this application, with reference to (b) in FIG. 7, after the ActiviyStart phase ends, it is not exactly a case in which no page fault occurs, but a page fault occurs at a relatively low probability. Therefore, to reduce a probability that a page fault occurs during a subsequent cold start of the application, a status bit in a PTE in a page table and a pageflag to which the PTE points may be traversed within specific duration existing when or after the DoFrame phase ends (an interface of the first Activity is displayed after the DoFrame phase ends), to obtain a file page used during the current cold start of the application, and a PTE snapshot may be generated based on a file name of file page data stored in the used file page, a storage address of the file page data in a disk, and the like.

A reason that the PTE snapshot may be used for the subsequent cold start includes: During the current cold start, the file page data is read from the disk to a physical memory, and the PTE is filled with a physical address of the file page data. To enable the file page data to be read from the disk to the physical memory in advance during a next cold start, the file name of the file page data on a physical page corresponding to the physical address in the PTE filled this time and the storage address of the file page data in the disk may be used to generate a PTE snapshot. In this way, during the subsequent cold start, the storage address, in the disk, of the file page data used in the cold start procedure of the application may be obtained based on the PTE snapshot, and this part of file page data may be read from the disk to the physical memory. After the start of the process of the application is completed and virtual space is allocated, a mapping relationship between the physical address of this part of file page data in the physical memory and a virtual address may be established, and the PTE may continue to be filled. In this way, occurrence of a page fault is reduced.

In another embodiment of this application, in actual application, a status bit in a PTE in a page table and a pageflag to which the PTE points may be traversed at any time point between a time after the ActiviyStart phase ends and a moment at which the DoFrame phase ends, to obtain a file page used during the current cold start of the application, and a PTE snapshot may be generated based on the used file page.

The PTE snapshot generated at any one of the time points listed above may be stored in the disk of the electronic device for use during the subsequent cold start of the application. Certainly, a time for storing the generated PTE snapshot in the disk of the electronic device may be later, provided that the PTE snapshot can be successfully stored during the next cold start. In an example, storage is performed immediately after generation, or storage is performed when the application is switched to the background for running or running ends.

With reference to (c) in FIG. 7, in a subsequent cold start procedure of the application, a page fault mainly occurs in and after the BindApplication phase. Therefore, before the BindApplication phase, a PTE snapshot stored during a historical cold start of the application needs to be read from the disk of the electronic device, and then file page data required by the process of the application is loaded into the physical memory based on information recorded in the PTE snapshot, to save a procedure of loading the file page data in the start procedure. Subsequently, after BindApplication (after BindApplication, the process is completely started and virtual space is allocated), PTE information may be filled. This reduces a probability of a page fault in the subsequent start procedure, and increases a start speed of the application.

In another embodiment of this application, after the electronic device receives a tap operation on the icon of the application on the system desktop, and before the BindApplication phase is started, a PTE snapshot stored during a historical cold start of the application may be read from the disk of the electronic device, and then file page data required by the process of the application may be loaded into the physical memory based on information recorded in the PTE snapshot, to save a procedure of loading the file page data in the start procedure. Subsequently, after BindApplication, PTE information may be filled. This reduces a probability of a subsequent page fault, and increases a start speed of the application.

A hot start of the application indicates that the process of the application is not destroyed after the application is rolled back to the background. Therefore, in the hot start, starting from ActivityStart, a hot start procedure of the application mainly includes:

The process of the application creates and starts an Activity existing before the application is rolled back to the background last time. This procedure is recorded as ActivityStart.

The Activity existing before the application is rolled back to the background last time enters a resume state. This procedure is recorded as ActivityResume.

A Choreographer object is created to monitor Vsync, so that a drawing task can be executed based on a screen refresh rate. This procedure is recorded as Choreographer.

The drawing task, for example, a measurement, layout, and drawing procedure of a window corresponding to the first Activity, is processed based on the screen refresh rate. A drawing phase in this procedure may be recorded as DoFrame.

It may be understood from FIG. 4 that during the hot start of the application, a page fault mainly occurs in an ActivityStart phase, an ActivityResume phase, and a Choreographer phase.

Figure 8:
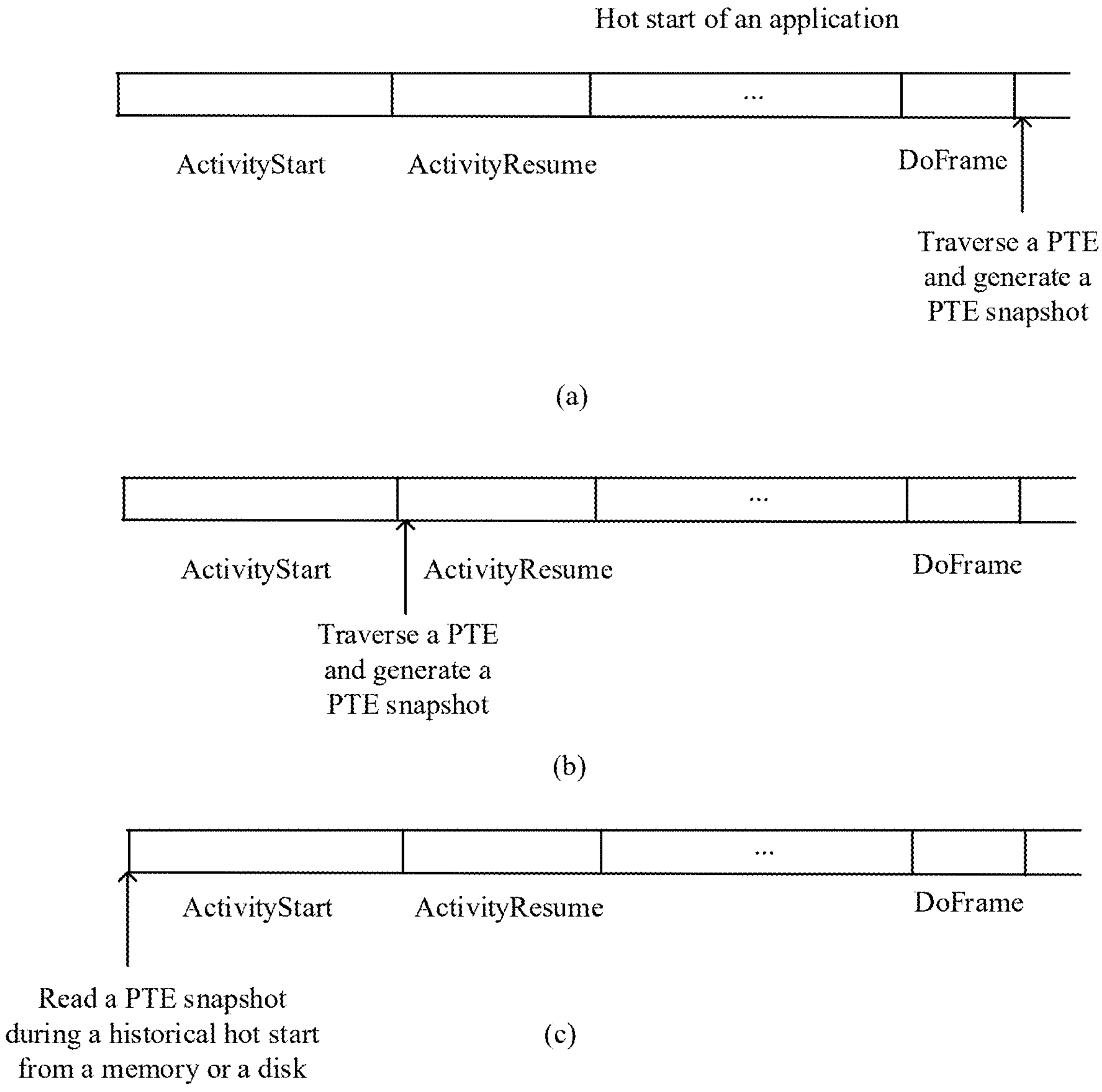
FIG. 8 is a schematic diagram of a time node for capturing a PTE snapshot and a time node for preloading the PTE snapshot during a hot start of an application according to an embodiment of this application.

With reference to (a) in FIG. 8, when or after the DoFrame phase ends, a PTE in a page table may be traversed, some file pages (for example, it is determined, based on a pageflag corresponding to the PTE, to select file pages of an Active type and a referenced type) and an anonymous page (for example, it is determined, based on the pageflag corresponding to the PTE, to select an anon type) used during the current hot start of the application may be obtained based on a status bit and the pageflag to which the PTE points, and a PTE snapshot may be generated based on the used file page and anonymous page.

In actual application, duration of the hot start is relatively short. If information about all page faults in the hot start procedure is still obtained, a procedure of reading and preloading the PTE snapshot from a disk or a memory during a subsequent hot start becomes relatively long, which undoubtedly prolongs the duration of the hot start. Therefore, a balance may be achieved between a time consumed for preloading and a time consumed for a page fault. For example, information about a relatively important page fault in the hot start procedure is selected to generate a PTE snapshot, and preloading duration becomes relatively short during the subsequent hot start, to reduce overall duration of the hot start.

Most of the information about the relatively important page fault in the hot start procedure is in the ActivityStart phase. With reference to (b) in FIG. 8, a status bit in a PTE in a page table and a pageflag to which the PTE points may be traversed within a relatively short time existing when or after the ActivityStart phase ends, to obtain some file pages (for example, it is determined, based on the pageflag corresponding to the PTE, to select file pages of an active type and a referenced type) and an anonymous page (for example, it is determined, based on the pageflag corresponding to the PTE, to select an anon type) used during the current hot start of the application, and a PTE snapshot may be generated based on the used file page and anonymous page.

In another embodiment of this application, a status bit in a PTE in a page table and a pageflag to which the PTE points may be traversed at any time point between a time after the ActiviyStart phase and a moment at which the DoFrame phase ends, to obtain some file pages (for example, it is determined, based on the pageflag corresponding to the PTE, to select file pages of an active type and a referenced type) and an anonymous page (for example, it is determined, based on the pageflag corresponding to the PTE, to select an anon type) used during the current hot start of the application, and a PTE snapshot may be generated based on information (for example, information such as a file name of a file stored on the file page and a storage address in a disk, and a storage address of data stored on the anonymous page in a swap partition) about the used file page and anonymous page.

The PTE snapshot generated at any one of the time points listed above may be stored in a memory or the disk of the electronic device for use during the subsequent hot start of the application.

With reference to (c) in FIG. 8, in a subsequent hot start procedure of the application, a large quantity of page faults occur in the ActivityStart phase. Therefore, before the ActivityStart phase, a PTE snapshot stored during a historical hot start of the application needs to be read from the memory or the disk of the electronic device, and then file page data and anonymous page data required by the process of the application are loaded based on information recorded in the PTE snapshot. During the hot start, the process exists in a system, and virtual space of the process is allocated. Therefore, PTE information may be pre-filled. This reduces a probability of a page fault, and increases a start speed of the application.

In another embodiment of this application, after the electronic device detects that the application is hot started, a PTE snapshot stored during a historical hot start of the application may be read from the memory or the disk of the electronic device, and then file page data and anonymous page data required by the process of the application may be loaded based on information recorded in the PTE snapshot, so that PTE information may be pre-filled. This reduces a probability of a page fault, and increases a start speed of the application To more clearly understand the method for preloading a memory page provided in the embodiments of this application, the following describes in detail a procedure of obtaining and storing a PTE snapshot and a procedure of preloading a PTE snapshot.

Linux divides virtual address space into two parts: user space and kernel space. The user space cannot directly access the kernel space. When a user process needs to access a kernel or use a kernel function, a system call needs to be used.

The kernel space provides a function entry for system calls. To enable the user space to use the entry of these system calls, these system calls may be encapsulated in the user space to obtain an encapsulation interface that can be directly used by a process in the user space.

When the process in the user space needs a system call to access some resources on a hardware device or an operating system, the process in the user space uses the system call through the encapsulation interface, and the system call accesses the resources on the hardware device or the system in the kernel by using the kernel function. That is, the system call may be used as an information interactor between the user space and the kernel space.

Figure 9:
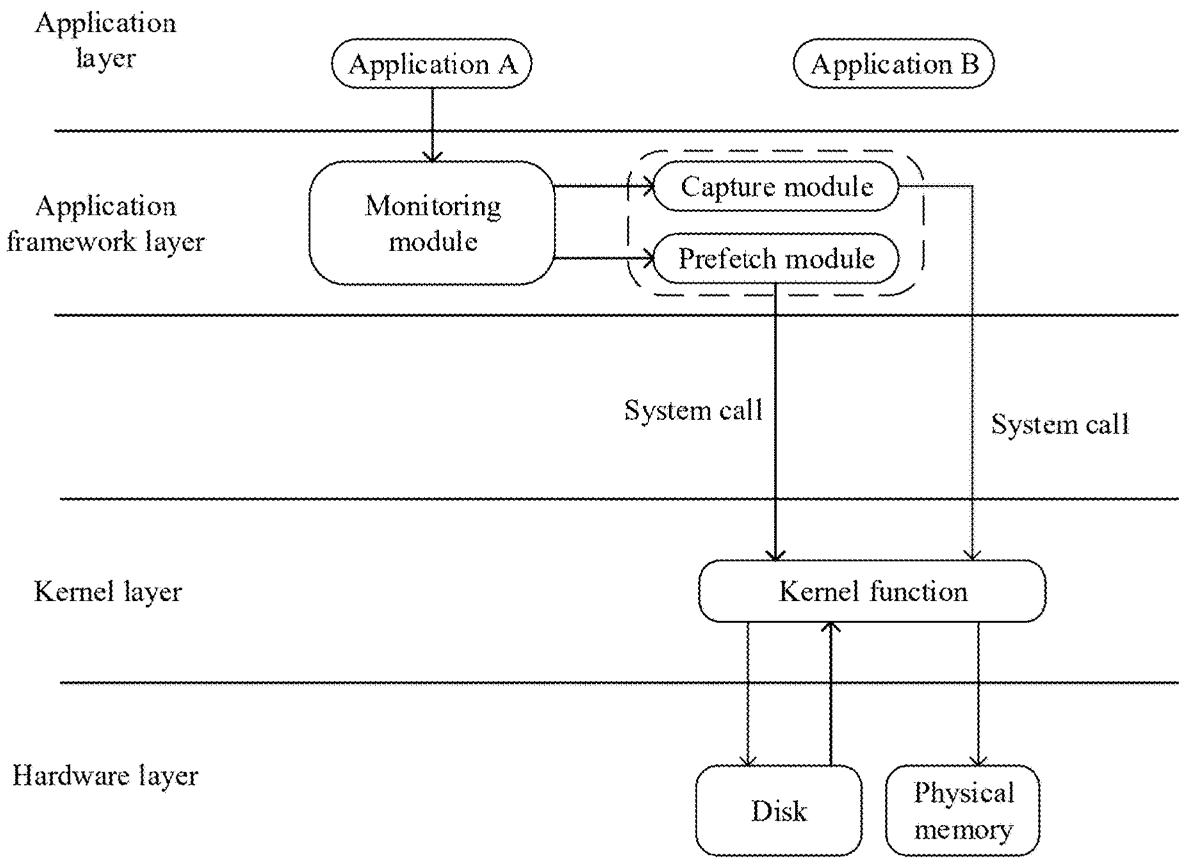
FIG. 9 is a schematic diagram of a technical architecture of a method for preloading a memory page according to an embodiment of this application.

With reference to a system architecture diagram shown in FIG. 9, there are a plurality of applications, for example, an application A and an application B, at an application layer.

There is a monitoring module, a prefetch module, and a capture module at an application framework layer. The prefetch module and the capture module may exist as one module or as two independent modules.

The monitoring module may be a separately disposed module configured to monitor a start procedure of an application, may be some services, in a system, that can monitor a start procedure of an application, or the like. After detecting that the application is started to a specific time node (for example, a time node at which prefetch needs to be performed), the monitoring module may send a prefetch instruction to the prefetch module. After detecting that the application is started to a specific time node (for example, a time node existing after a DoFrame phase), the monitoring module may send a capture instruction to the capture module.

After receiving the prefetch instruction (or the capture module receives the capture instruction), the prefetch module may perform a system call, to transmit a unique identifier of the currently started application and a start manner to a called kernel function.

There is a kernel function at a kernel layer, and the kernel function is used to implement different functions, for example, a prefetch function provided in embodiments of this application and a function of traversing a PTE to generate a PTE snapshot provided in embodiments of this application.

There is a disk and a physical memory at a hardware layer. The disk is configured to store a PTE snapshot generated during a cold start and file page data required in a start procedure of an application. During a subsequent start, the kernel first reads the PTE snapshot from the disk, and then preloads file page data corresponding to information recorded in the PTE snapshot from the disk into the physical memory. A PTE snapshot generated during a hot start may be stored in the disk or the physical memory as required.

Figure 10:
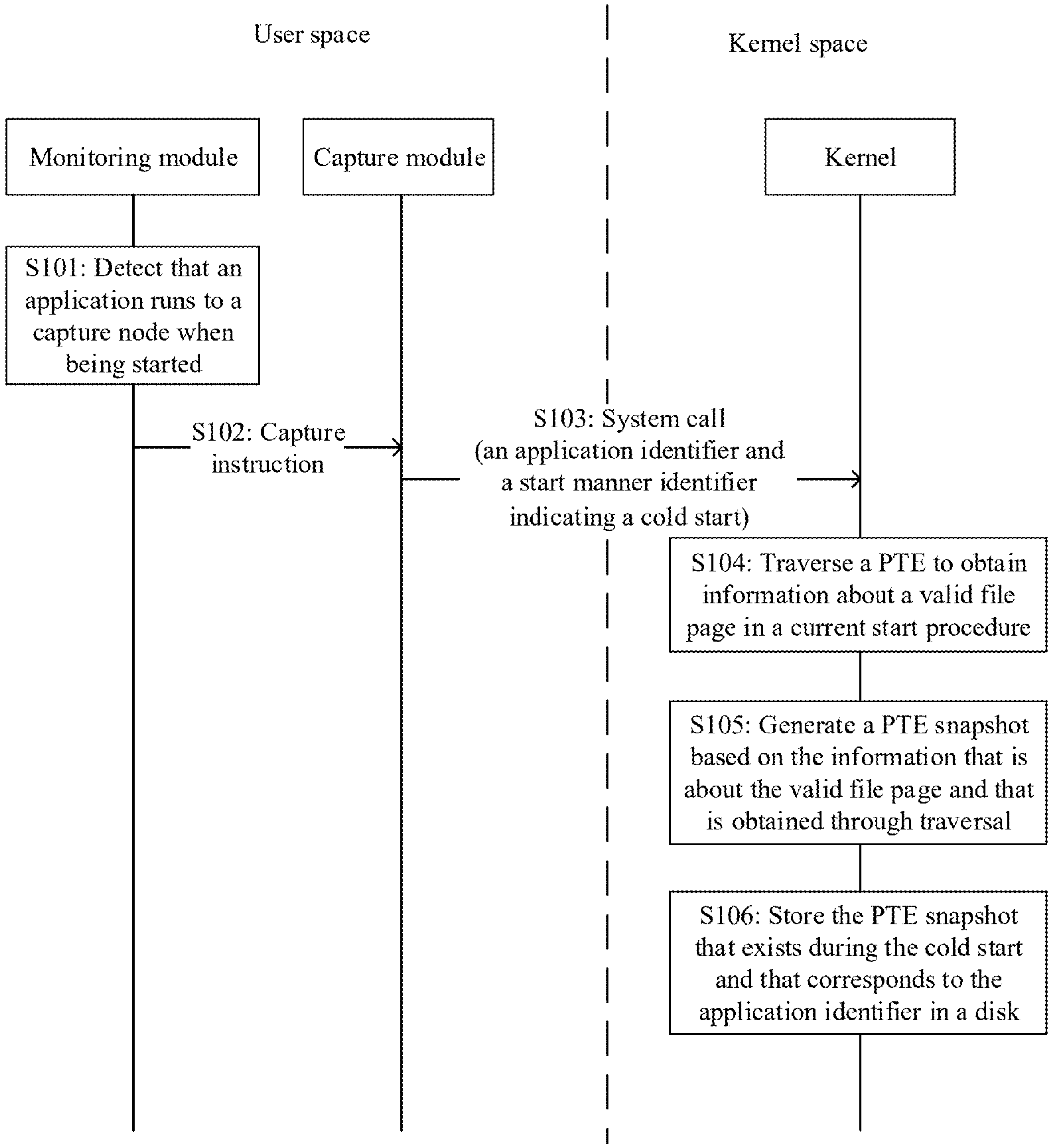
FIG. 10 is a diagram of a time sequence of capturing a PTE snapshot during a cold start of an application according to an embodiment of this application.

To more clearly understand interaction between the modules, refer to a time sequence diagram that is of a procedure of generating and storing a PTE snapshot during a cold start of an application and that is shown in FIG. 10. The monitoring module and the capture module are located in the user space, and the kernel is located in the kernel space.

S101: The monitoring module detects that the application runs to a capture node when being started.

In this embodiment of this application, if a current start procedure of the application is a cold start, the capture node is any preset node between nodes shown in (a) in FIG. 7 and (b) in FIG. 7.

S102: After detecting that the application runs to the capture node when being started, the monitoring module sends a capture instruction to the capture module.

S103: The capture module performs a system call, and transmits a unique identifier of the currently started application and a start manner identifier to a called kernel function.

In this embodiment of this application, each application has a unique identifier used to distinguish between different applications, to associate the unique identifier of the application when a PTE snapshot corresponding to the application is stored, and distinguish the PTE snapshot from a PTE snapshot of another application. A start manner is used to determine whether the generated PTE snapshot is a PTE snapshot during a hot start or a PTE snapshot during a cold start.

In this embodiment of this application, the start manner identifier indicates that the current start is a cold start.

S104: The kernel traverses a PTE to obtain information about a valid file page in a current start procedure.

If the start manner identifier indicates that the current start is a cold start, file names of all valid file pages (for example, the valid file page is that a PTE status bit indicates that mapping to a physical address is implemented, and a pageflag is a file page) and storage addresses in disk space are obtained.

S105: The kernel generates a PTE snapshot based on the information that is about the valid file page and that is obtained through traversal. Certainly, the PTE snapshot may further include other information about file page data. This is not limited in this embodiment of this application.

S106: The kernel stores the PTE snapshot that exists during the cold start and that corresponds to the application identifier in the disk.

In this manner, information about all the valid file pages in the cold start procedure of the application may be obtained for use during a subsequent cold start of the application.

Figure 11:
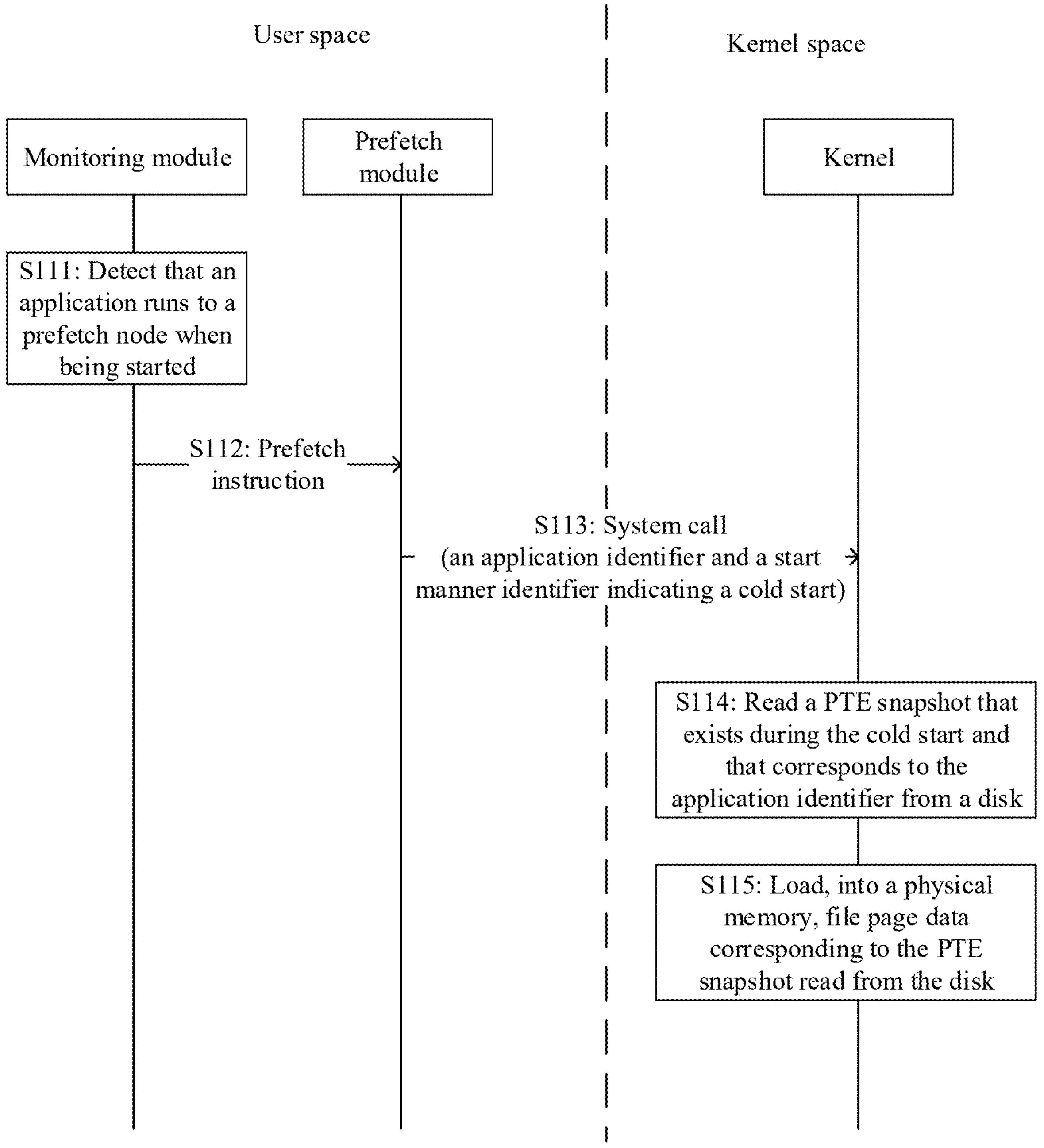
FIG. 11 is a diagram of a time sequence of preloading a PTE snapshot during a cold start of an application according to an embodiment of this application.

Refer to a time sequence diagram that is of a procedure of prefetching a PTE snapshot during a cold start of an application and that is shown in FIG. 11. The monitoring module and the prefetch module are located in the user space, and the kernel is located in the kernel space.

S111: The monitoring module detects that the application runs to a prefetch node when being started.

In this embodiment of this application, if a current start procedure of the application is a cold start, the prefetch node is any node before the start of BindApplication shown in (c) in FIG. 7.

S112: After detecting that the application runs to the prefetch node when being started, the monitoring module sends a prefetch instruction to the prefetch module.

S113: The prefetch module performs a system call, and transmits a unique identifier of the currently started application and a start manner to a called kernel function.

In this embodiment of this application, each application has a unique identifier used to distinguish between different applications, to obtain a PTE snapshot corresponding to the application. A start manner identifier is used to determine whether to obtain a PTE snapshot during a historical hot start or a PTE snapshot during a historical cold start.

In this embodiment of this application, the start manner identifier indicates that the current start is a cold start.

S114: After being called by the system, the kernel may read a PTE snapshot that exists during the cold start and that corresponds to the received application identifier from the disk based on the application identifier.

S115: After reading the PTE snapshot, the kernel loads, into the physical memory, file page data corresponding to the PTE snapshot read from the disk.

Subsequently, after a start of a process of the application is completed and an application for virtual space is successfully made, the kernel may fill PTE information (for example, fill the PTE information with a mapping relationship between a virtual address and a physical address at which the file page data loaded into the physical memory is currently located) in a page table of a process corresponding to the application identifier based on the physical address.

In this preloading manner, file page information required in the cold start procedure of the application may be preloaded into the physical memory, to save a procedure of loading the file page data in the start procedure. In addition, after the start of the process of the application is completed and an application for a virtual memory is made, the PTE information may be further filled. This reduces occurrence of a page fault, and increases a cold start speed of the application.

It should be noted that in specific implementation, the following logic further exists: If a PTE snapshot of the same application during a historical cold start is stored in the disk, a PTE snapshot of the same application during a cold start does not need to be stored again during a subsequent cold start. Correspondingly, when the application is cold started, a prefetch procedure is performed only when the PTE snapshot of the application during the historical cold start is stored in the disk.

Figure 12:
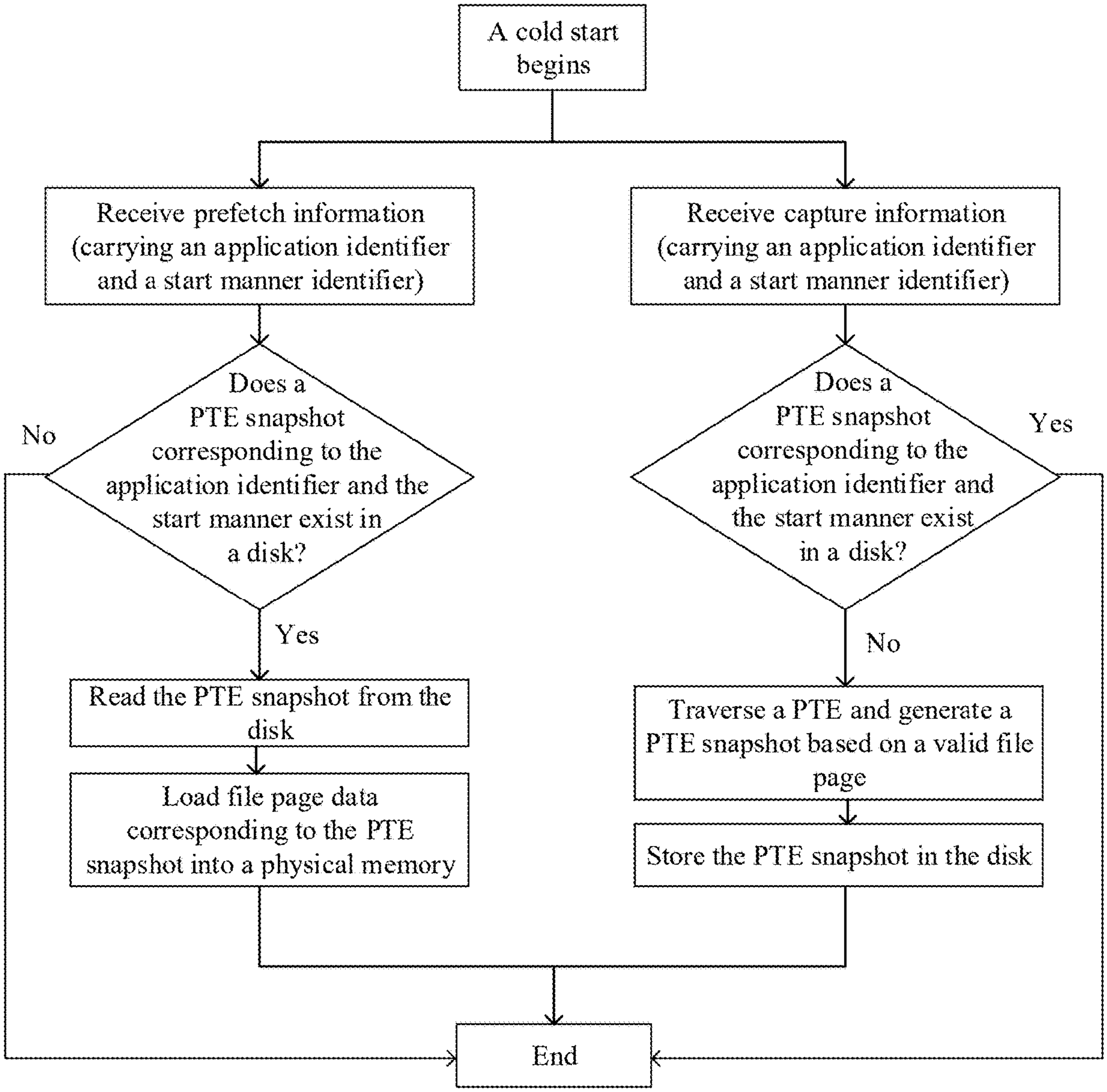
FIG. 12 is a schematic diagram of a procedure performed by a kernel during a cold start of an application according to an embodiment of this application.

FIG. 12 is a diagram of a logical procedure during a cold start of an application according to an embodiment of this application.

At a moment after the cold start begins, the kernel passively receives prefetch information (the information is used to indicate to perform prefetch). The prefetch information carries an application identifier and a start manner identifier. The kernel determines whether a PTE snapshot corresponding to the application identifier and the start manner identifier exists in the disk. If the PTE snapshot corresponding to the application identifier and the start manner identifier exists in the disk, the PTE snapshot is read from the disk, and file page data corresponding to the PTE snapshot is loaded into the physical memory. Certainly, if the PTE snapshot corresponding to the application identifier and the start manner identifier does not exist in the disk, the procedure ends.

At a moment after the cold start begins, the kernel passively receives capture information (the information is used to indicate to capture a PTE snapshot). A time for receiving the capture information is usually later than that of the prefetch information. The capture information carries an application identifier and a start manner identifier. The kernel determines whether a PTE snapshot corresponding to the application identifier and the start manner exists in the disk. If the PTE snapshot corresponding to the application identifier and the start manner identifier does not exist in the disk, a PTE is traversed, a PTE snapshot is generated based on a valid file page, and the PTE snapshot is associatively stored with the received application identifier and start manner identifier in the disk. Certainly, if the PTE snapshot corresponding to the application identifier and the start manner identifier exists in the disk, the procedure ends.

In actual application, if the application is uninstalled, the PTE snapshot of the application needs to be deleted from the disk.

Figure 13:
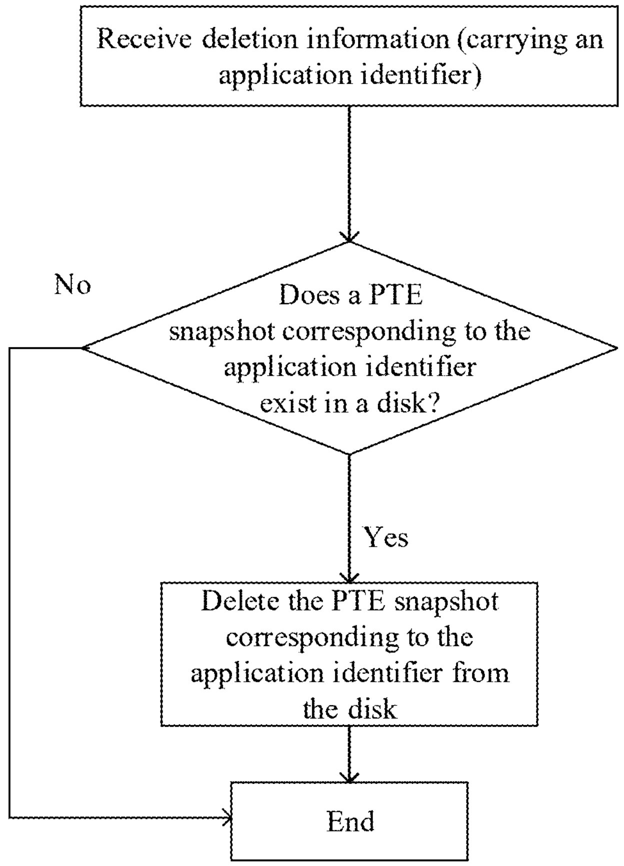
FIG. 13 is a schematic diagram of a procedure performed by a kernel when an application is uninstalled according to an embodiment of this application.

FIG. 13 is a diagram of a logical procedure existing when an application is uninstalled according to an embodiment of this application.

The kernel receives deletion information (the information is used to indicate to delete a PTE snapshot). The deletion information carries an application identifier. The kernel determines whether a PTE snapshot corresponding to the application identifier exists in the disk. If the PTE snapshot corresponding to the application identifier exists in the disk, the PTE snapshot corresponding to the application expression is deleted from the disk. If the PTE snapshot corresponding to the application identifier does not exist in the disk, the procedure ends.

In the foregoing embodiments, interaction between the modules is described by using the cold start of the application as an example. The following describes interaction between the modules by using a hot start of the application as an example. Differences between the hot start and the cold start of the application mainly include:

(1) A time for prefetch is different. However, for the kernel, information indicating to perform prefetch is passively received.

(2) A time for capturing a PTE snapshot may be different. Similarly, for the kernel, information indicating to capture a snapshot is passively received.

(3) Missing page information for generating the PTE snapshot is different. Correspondingly, different memory page data is loaded. During the cold start, the kernel may generate the PTE snapshot based on all the valid file pages of the application. Correspondingly, the file page data is loaded. During the hot start, the kernel may generate the PTE snapshot based on some valid file pages and valid anonymous pages of the application. During the hot start, the kernel may further generate the PTE snapshot by using a recently accessed memory page with reference to pte_young in a PTE status bit. Correspondingly, file page data and anonymous page data are loaded.

(4) A different operation is performed after memory page data corresponding to the PTE snapshot is loaded into the physical memory. During the cold start, after the file page data corresponding to the PTE snapshot is loaded into the physical memory, an operation of filling the PTE can continue to be performed only after the start of the process of the application is completed and an application for the virtual memory is made. During the hot start, the process of the application already exists, and a virtual memory is obtained for the process by making an application. Therefore, the kernel may establish a mapping relationship between a virtual address and a physical address of the file page data loaded into the physical memory based on the physical address, and fill a PTE.

(5) Storage space of the PTE snapshot may be different. The PTE snapshot corresponding to the cold start needs to be stored in the disk. The PTE snapshot corresponding to the hot start may be stored in the disk or the memory. This is because when the process of the application is killed, related information about the application stored in the memory is cleared. Therefore, even if the PTE snapshot corresponding to the cold start of the application is stored in the memory, when the application is cold started next time, the PTE snapshot in the memory is cleared, and prefetch cannot be performed.

In addition, during the hot start, if the PTE snapshot is stored in the physical memory, memory space for storing the PTE snapshot, memory space for storing a page table, and memory space for storing other data (for example, a code segment) of the application are different storage space in the physical memory.

Certainly, if it is preset that the PTE snapshot is stored in the physical memory, when prefetch is performed, the PTE snapshot during the hot start of the application is read from the physical memory. If it is preset that the PTE snapshot is stored in the disk, when prefetch is performed, the PTE snapshot during the hot start of the application is read from the disk.

For an interaction diagram between the modules during the hot start of the application, refer to the interaction diagrams between the modules during the cold start of the application shown in FIG. 10 and FIG. 11.

Figure 14:
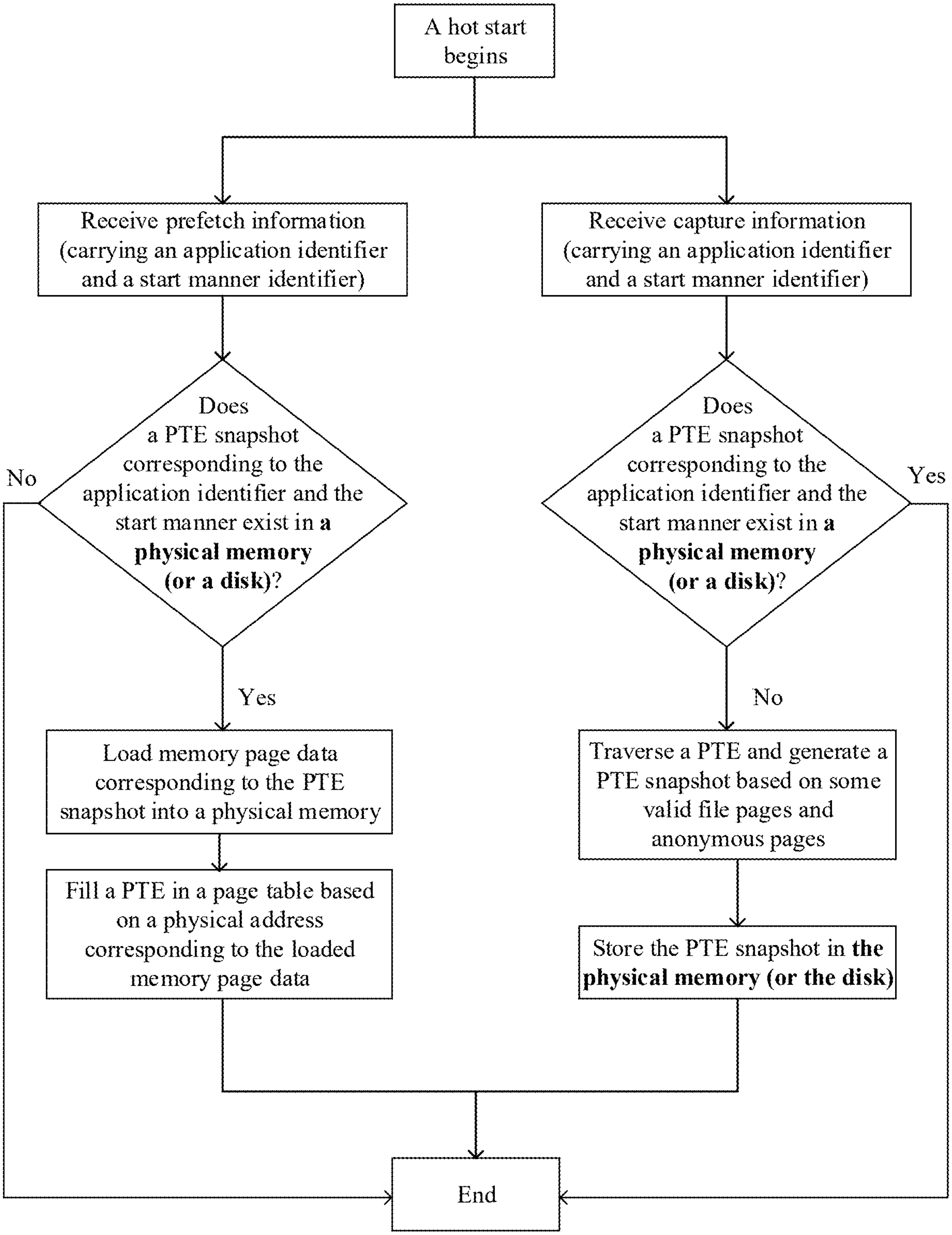
FIG. 14 is a schematic diagram of a procedure performed by a kernel during a hot start of an application according to an embodiment of this application.

FIG. 14 is a diagram of processing logic of the kernel during a hot start of an application according to an implementation of this application.

At a moment after the hot start is started, the kernel passively receives prefetch information (the information is used to indicate to perform prefetch). The prefetch information carries an application identifier and a start manner identifier. The kernel determines whether a PTE snapshot corresponding to the application identifier and the start manner identifier exists in the physical memory (or the disk).

If the PTE snapshot corresponding to the application identifier and the start manner identifier exists in the physical memory (or the disk), memory page data (including file page data and anonymous page data) corresponding to the PTE snapshot is loaded into the physical memory, and PTE information is filled (for example, filled with a mapping relationship between a virtual address and a physical address at which the memory page data is located) in a page table based on the physical address. Certainly, if the PTE snapshot corresponding to the application identifier and the start manner identifier does not exist in the physical memory (or the disk), the procedure ends.

At a moment after the hot start is started, the kernel passively receives capture information (the information is used to indicate to capture a PTE snapshot). A time for receiving the capture information is usually later than that of the prefetch information. The capture information carries an application identifier and a start manner identifier. The kernel determines whether a PTE snapshot corresponding to the application identifier and the start manner exists in the physical memory (or the disk). If the PTE snapshot corresponding to the application identifier and the start manner identifier does not exist in the physical memory (or the disk), a PTE is traversed, a PTE snapshot is generated based on some types of valid file pages and a valid anonymous page, and the PTE snapshot is associatively stored with the received application identifier and start manner identifier in the physical memory (or the disk). Certainly, if the PTE snapshot corresponding to the application identifier and the start manner identifier exists in the physical memory (or the disk), the procedure ends.

In actual application, if the application is uninstalled, the PTE snapshot of the application needs to be deleted from the physical memory (or the disk).

In another embodiment of this application, an application start manner may further include a warm start, and the warm start and the hot start may be combined into one start manner to use a same start procedure. The application start method provided in the embodiments of this application may be applied to a plurality of application start manners. In the embodiments of this application, each of a plurality of applications is started three times in three start manners, an overall delay is reduced by 13%, and an IO wait (that is, a time that is in one sampling period and in which a CPU is idle and there is at least one unfinished disk IO request) of a UI thread is reduced by 47%. For details, refer to Table 1 and FIG. 15.

TABLE 1

Comparison between delays, IO waits, and gains in a native procedure and the application start manner provided in this application (unit: ms)

| | Native procedure | | This application | | Gains | | |
|---|---|---|---|---|---|---|---|
| Application | Total delay | IO wait | Total delay | IO wait | Total delay | Percentage | IO wait percentage |
| A | 648 | 103 | 580 | 63 | 68 | 10% | 39% |
| B | 592 | 93 | 521 | 39 | 71 | 12% | 58% |
| C | 545 | 85 | 483 | 28 | 62 | 11% | 67% |
| D | 624 | 109 | 594 | 73 | 30 | 5% | 33% |
| E | 587 | 112 | 503 | 45 | 84 | 14% | 60% |
| F | 426 | 106 | 268 | 23 | 157 | 37% | 78% |
| G | 403 | 54 | 362 | 34 | 41 | 10% | 37% |
| H | 598 | 69 | 467 | 24 | 131 | 22% | 65% |
| I | 527 | 69 | 536 | 47 | −9 | −2% | 31% |
| J | 689 | 98 | 591 | 98 | 98 | 14% | 0% |
| K | 564 | 90 | 490 | 47 | 73 | 13% | 47% |

It may be understood from Table 1 that in the method for preloading a memory page in an application start procedure provided in the embodiments of this application, the total delay may be approximately increased by a gain of at least 10%, and the IO wait may be increased by a higher gain.

Figure 15:
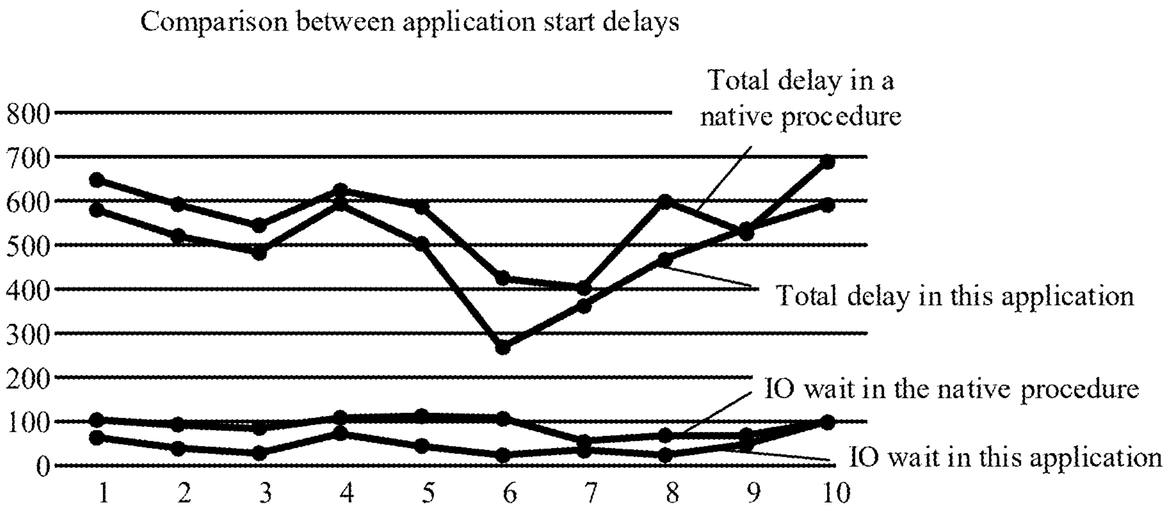
FIG. 15 is a schematic diagram of comparison between delays and IO waits in an application start method and a native procedure according to an embodiment of this application.

For clearer comparison between the delays in the two application start manners, refer to a schematic diagram of delay comparison shown in FIG. 15. The total delay and the IO wait in the application start manner provided in this application are significantly less than those in the native procedure.

It should be understood that sequence numbers of the steps in the foregoing embodiments do not mean execution sequences. The execution sequences of the procedures should be determined based on functions and internal logic of the procedures, and should not be construed as any limitation on the implementation procedures of the embodiments of this application.

An embodiment of this application further provides a computer-readable storage medium. The computer-readable storage medium stores a computer program, and when the computer program is executed by a processor, the steps in the foregoing method embodiments may be implemented.

An embodiment of this application further provides a computer program product. When the computer program product runs on a first device, an electronic device is enabled to implement the steps in the foregoing method embodiments.

When an integrated unit is implemented in a form of a software functional unit and sold or used as an independent product, the integrated unit may be stored in a computer-readable storage medium. Based on such an understanding, in this application, all or some of the procedures in the methods in the foregoing embodiments may be implemented by a computer program instructing related hardware. The computer program may be stored in a computer-readable storage medium. When the computer program is executed by a processor, the steps in the foregoing method embodiments may be implemented. The computer program includes computer program code, and the computer program code may be in a source code form, an object code form, an executable file form, some intermediate forms, or the like. The computer-readable medium may include at least any entity or apparatus that can carry the computer program code to the first device, a recording medium, a computer storage, a read-only memory (ROM, Read-Only Memory), a random access memory (RAM, Random Access Memory), an electrical carrier signal, a telecommunications signal, and a software distribution medium, for example, a USB flash drive, a removable hard disk, a magnetic disk, or an optical disc. In some jurisdictions, the computer-readable medium cannot be an electrical carrier signal or a telecommunications signal according to legislation and patent practice.

An embodiment of this application further provides a chip system. The chip system includes a processor. The processor is coupled to a storage, and the processor executes a computer program stored in the storage, to implement the steps in any method embodiment of this application. The chip system may be a single chip or a chip module including a plurality of chips.

In the foregoing embodiments, descriptions of the embodiments have respective focuses. For a part that is not detailed or described in an embodiment, refer to related descriptions in other embodiments.

Persons of ordinary skill in the art may be aware that the example units and method steps described with reference to the embodiments disclosed in this specification can be implemented by electronic hardware, or a combination of computer software and electronic hardware. Whether these functions are performed by hardware or software depends on specific applications and design constraints of the technical solutions. Persons skilled in the art may use different methods to implement the described functions for each specific application, but it should not be considered that such an implementation goes beyond the scope of this application.

The foregoing embodiments are merely used to describe the technical solutions of this application, but not limit the technical solutions of this application. Although this application is described in detail with reference to the foregoing embodiments, persons of ordinary skill in the art should understand that they may still modify the technical solutions described in the foregoing embodiments, or perform equivalent replacement on some technical features. However, these modifications or replacements do not make the essence of the corresponding technical solutions depart from the spirit and scope of the technical solutions in the embodiments of this application, and shall fall within the protection scope of this application.

The invention claimed is:

1. A method for preloading a memory page, applied to a kernel of an electronic device, wherein the method comprises:

receiving prefetch information, wherein the prefetch information comprises an identifier of a first application and a hot start identifier;

reading a page table entry snapshot corresponding to the identifier of the first application from first storage space in response to the prefetch information, wherein the page table entry snapshot is generated based on a page table entry accessed during a historical hot start procedure of the first application, a page object in the page table entry accessed during the historical hot start procedure of the first application is a file page and an anonymous page, and the first storage space is located in physical memory or a disk;

loading file page data and anonymous page data that respectively correspond to the page table entry snapshot in second storage space and third storage space into a physical memory; and writing a mapping relationship between a virtual memory of the file page data and a physical memory of the file page data and a mapping relationship between a virtual memory of the anonymous page data and a physical memory of the anonymous page data into a page table entry of the first application.

2. The method according to claim 1, wherein before the receiving prefetch information, the method further comprises:

receiving capture information, wherein the capture information comprises the identifier of the first application and the hot start identifier;

generating the page table entry snapshot corresponding to the identifier of the first application in response to the capture information based on a page table entry corresponding to the identifier of the first application; and storing the page table entry snapshot corresponding to the identifier of the first application in the first storage space.

3. The method according to claim 2, wherein the generating the page table entry snapshot corresponding to the identifier of the first application in response to the capture information based on a page table entry corresponding to the identifier of the first application-comprises:

determining, in response to the capture information, that no page table entry snapshot corresponding to the identifier of the first application does not exists in the first storage space; and based on determining that no page table entry snapshot corresponding to the identifier of the first application exists in the first storage space, generating the page table entry snapshot corresponding to the identifier of the first application based on the page table entry corresponding to the identifier of the first application.

4. The method according to claim 2, wherein the generating the page table entry snapshot corresponding to the identifier of the first application based on the page table entry corresponding to the identifier of the first application comprises:

generating the page table entry snapshot corresponding to the identifier of the first application by using a page table entry that is in a page table corresponding to the identifier of the first application and in which a status bit is a preset character and a page object is of a preset type, wherein the preset character is used to indicate that a virtual memory corresponding to the page table entry is mapped to a physical memory and accessed, and the preset type comprises active, referenced, or anon.

5. The method according to claim 1, wherein the method further comprises:

receiving deletion information, wherein the deletion information comprises the identifier of the first application; and deleting, in response to the deletion information, the page table entry snapshot that corresponds to the identifier of the first application and that is stored in the first storage space.

6. The method according to claim 1, wherein the page table entry of the first application comprises a mapping relationship between a virtual memory and a physical memory, and the page table entry snapshot comprises a file name of file page data corresponding to the page table entry, a storage address of the file page data, and a storage address of anonymous page data corresponding to the page table entry in a swap partition.

7. An electronic device, wherein the electronic device comprises a processor, and the processor is configured to run a computer program stored in a storage, to enable the electronic device to implement:

receiving prefetch information, wherein the prefetch information comprises an identifier of a first application and a hot start identifier;

reading a page table entry snapshot corresponding to the identifier of the first application from first storage space in response to the prefetch information, wherein the page table entry snapshot is generated based on a page table entry accessed during a historical hot start procedure of the first application, a page object in the page table entry accessed during the historical hot start procedure of the first application is a file page and an anonymous page, and the first storage space is located in physical memory or a disk;

loading file page data and anonymous page data that respectively correspond to the page table entry snapshot in second storage space and third storage space into a physical memory; and writing a mapping relationship between a virtual memory of the file page data and a physical memory of the file page data and a mapping relationship between a virtual memory of the anonymous page data and a physical memory of the anonymous page data into a page table entry of the first application.

8. The electronic device according to claim 7, wherein before the receiving prefetch information, the electronic device is further enabled to implement:

receiving capture information, wherein the capture information comprises the identifier of the first application and the hot start identifier;

generating the page table entry snapshot corresponding to the identifier of the first application in response to the capture information based on a page table entry corresponding to the identifier of the first application; and storing the page table entry snapshot corresponding to the identifier of the first application in the first storage space.

9. The electronic device according to claim 8, wherein the generating the page table entry snapshot corresponding to the identifier of the first application in response to the capture information based on a page table entry corresponding to the identifier of the first application comprises:

determining, in response to the capture information, that no page table entry snapshot corresponding to the identifier of the first application exists in the first storage space; and based on determining that no page table entry snapshot corresponding to the identifier of the first application exists in the first storage space, generating the page table entry snapshot corresponding to the identifier of the first application based on the page table entry corresponding to the identifier of the first application.

10. The electronic device according to claim 8, wherein the generating the page table entry snapshot corresponding to the identifier of the first application based on the page table entry corresponding to the identifier of the first application comprises:

generating the page table entry snapshot corresponding to the identifier of the first application by using a page table entry that is in a page table corresponding to the identifier of the first application and in which a status bit is a preset character and a page object is of a preset type, wherein the preset character is used to indicate that a virtual memory corresponding to the page table entry is mapped to a physical memory and accessed, and the preset type comprises active, referenced, or anon.

11. The electronic device according to claim 7, wherein the electronic device is further enabled to implement:

receiving deletion information, wherein the deletion information comprises the identifier of the first application; and deleting, in response to the deletion information, the page table entry snapshot that corresponds to the identifier of the first application and that is stored in the first storage space.

12. The electronic device according to claim 7, wherein the page table entry of the first application comprises a mapping relationship between a virtual memory and a physical memory, and the page table entry snapshot comprises a file name of file page data corresponding to the page table entry, a storage address of the file page data, and a storage address of anonymous page data corresponding to the page table entry in a swap partition.

13. A non-transitory computer-readable storage medium, wherein the non-transitory computer-readable storage medium stores a computer program, and when the computer program is executed by a processor, the processor is enabled to implement:

receiving prefetch information, wherein the prefetch information comprises an identifier of a first application and a hot start identifier;

reading a page table entry snapshot corresponding to the identifier of the first application from first storage space in response to the prefetch information, wherein the page table entry snapshot is generated based on a page table entry accessed during a historical hot start procedure of the first application, a page object in the page table entry accessed during the historical hot start procedure of the first application is a file page and an anonymous page, and the first storage space is located in physical memory or a disk;

loading file page data and anonymous page data that respectively correspond to the page table entry snapshot in second storage space and third storage space into a physical memory; and writing a mapping relationship between a virtual memory of the file page data and a physical memory of the file page data and a mapping relationship between a virtual memory of the anonymous page data and a physical memory of the anonymous page data into a page table entry of the first application.

14. The non-transitory computer-readable storage medium according to claim 13, wherein when the computer program is executed by the processor, the processor is enabled to further implement:

before the receiving prefetch information, receiving capture information, wherein the capture information comprises the identifier of the first application and the hot start identifier;

generating the page table entry snapshot corresponding to the identifier of the first application in response to the capture information based on a page table entry corresponding to the identifier of the first application; and storing the page table entry snapshot corresponding to the identifier of the first application in the first storage space.

15. The non-transitory computer-readable storage medium according to claim 14, wherein the generating the page table entry snapshot corresponding to the identifier of the first application in response to the capture information based on a page table entry corresponding to the identifier of the first application-comprises:

determining, in response to the capture information, that no page table entry snapshot corresponding to the identifier of the first application exists in the first storage space; and based on determining that no page table entry snapshot corresponding to the identifier of the first application exists in the first storage space, generating the page table entry snapshot corresponding to the identifier of the first application based on the page table entry corresponding to the identifier of the first application.

16. The non-transitory computer-readable storage medium according to claim 14, wherein the generating the page table entry snapshot corresponding to the identifier of the first application based on the page table entry corresponding to the identifier of the first application comprises:

generating the page table entry snapshot corresponding to the identifier of the first application by using a page table entry that is in a page table corresponding to the identifier of the first application and in which a status bit is a preset character and a page object is of a preset type, wherein the preset character is used to indicate that a virtual memory corresponding to the page table entry is mapped to a physical memory and accessed, and the preset type comprises active, referenced, or anon.

17. The non-transitory computer-readable storage medium according to claim 13, wherein when the computer program is executed by the processor, the processor is enabled to further implement:

receiving deletion information, wherein the deletion information comprises the identifier of the first application; and deleting, in response to the deletion information, the page table entry snapshot that corresponds to the identifier of the first application and that is stored in the first storage space.

18. The non-transitory computer-readable storage medium according to claim 13, wherein the page table entry of the first application comprises a mapping relationship between a virtual memory and a physical memory, and the page table entry snapshot comprises a file name of file page data corresponding to the page table entry, a storage address of the file page data, and a storage address of anonymous page data corresponding to the page table entry in a swap partition.

19. The method according to claim 1, wherein the prefetch information is received in a hot start procedure of the first application, before an ActivityStart phase of the hot start procedure of the first application.

20. The method according to claim 1, wherein the historical hot start procedure of the first application comprises an ActivityStart phase, an ActivityResume phase, a Choreographer phase, and a DoFrame phase, and wherein the page table entry snapshot is generated based on a plurality of page table entries accessed during at least one of the ActivityStart phase, the ActivityResume phase, the Choreographer phase, or the DoFrame phase of the historical hot start procedure.

* * * * *